(12) United States Patent
Hata et al.

(10) Patent No.: US 8,202,505 B2
(45) Date of Patent: *Jun. 19, 2012

(54) ALIGNED CARBON NANOTUBE BULK AGGREGATE, PROCESS FOR PRODUCING THE SAME AND USES THEREOF

(75) Inventors: Kenji Hata, Ibaraki (JP); Don N. Futaba, Ibaraki (JP); Motoo Yumura, Ibaraki (JP); Sumio Iijima, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/461,802

(22) Filed: Aug. 25, 2009

(65) Prior Publication Data

US 2010/0196249 A1 Aug. 5, 2010

Related U.S. Application Data

(63) Continuation-in-part of application No. 12/087,450, filed as application No. PCT/JP2007/050050 on Jan. 5, 2007, now abandoned.

(30) Foreign Application Priority Data

Jan. 6, 2006 (JP) ................................. 2006-001901

(51) Int. Cl.
*D01F 9/12* (2006.01)
*B32B 9/00* (2006.01)

(52) U.S. Cl. ............... 423/447.2; 423/447.1; 423/447.3; 428/408; 977/742; 977/843

(58) Field of Classification Search .... 423/447.1–447.3, 423/445 B; 977/742–754, 842–848; 428/367, 428/408

See application file for complete search history.

(56) References Cited

U.S. PATENT DOCUMENTS

2008/0170982 A1* 7/2008 Zhang et al. ............... 423/447.3
* cited by examiner

*Primary Examiner* — Daniel C. McCracken
(74) *Attorney, Agent, or Firm* — Wenderoth, Lind & Ponack, L.L.P.

(57) ABSTRACT

An aligned carbon nanotube bulk structure capable of attaining high density and high hardness not found so far. The aligned carbon nanotube bulk structure has a plurality of carbon nanotubes (CNTs) applied with a density-increasing treatment, and having alignment in a predetermined direction, the structure has a degree of anisotropy of 1:3 or more between the direction of alignment and the direction vertical to the direction of alignment, and the intensity by irradiating X-rays along the direction of alignment is higher than the intensity by irradiating X-rays from the direction vertical to the direction of alignment at a (002) peak in X-ray diffraction data, and the degree of alignment thereof satisfies predetermined conditions.

2 Claims, 19 Drawing Sheets

[Fig. 1]
(a)
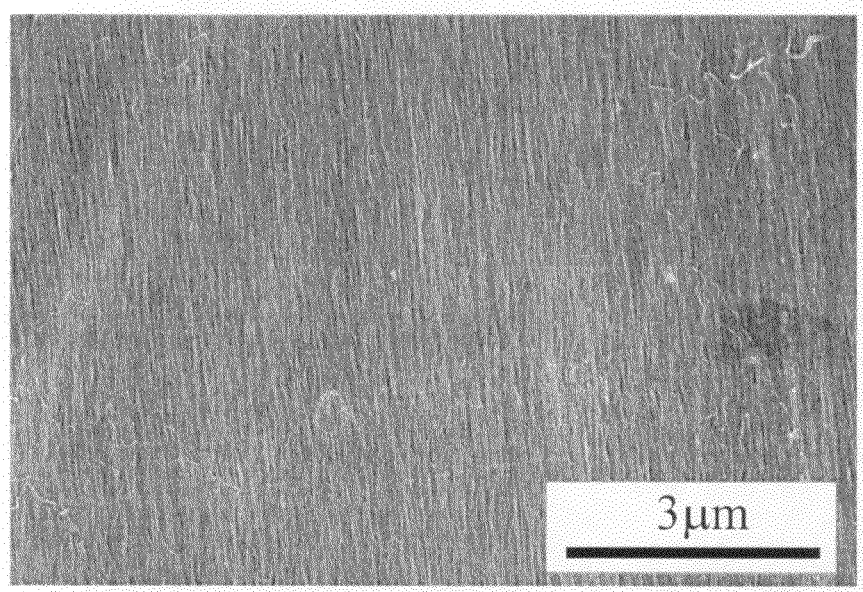
(b)
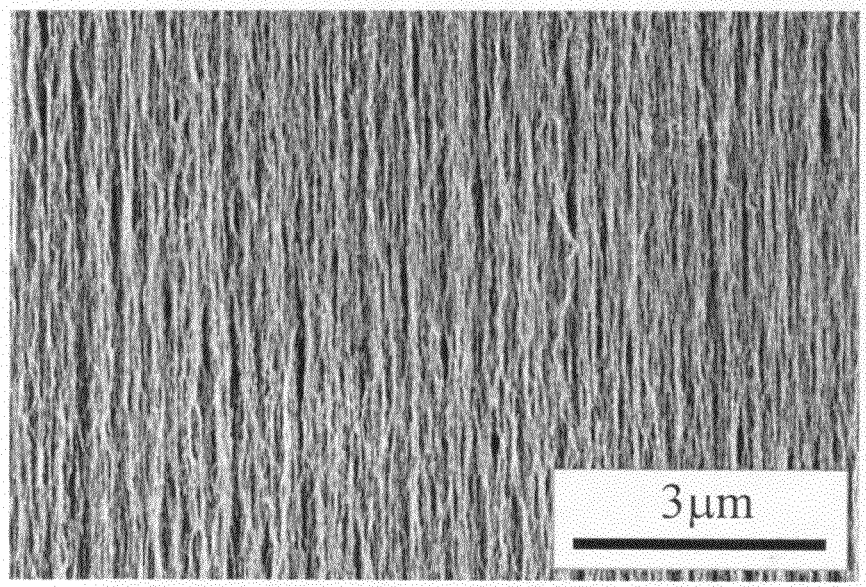

[Fig. 2]
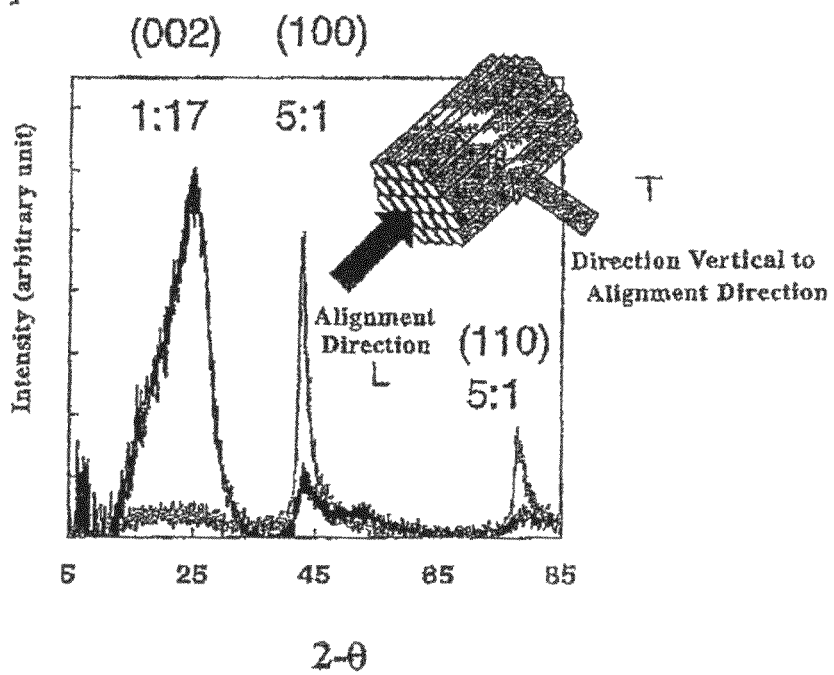
[Fig. 3]
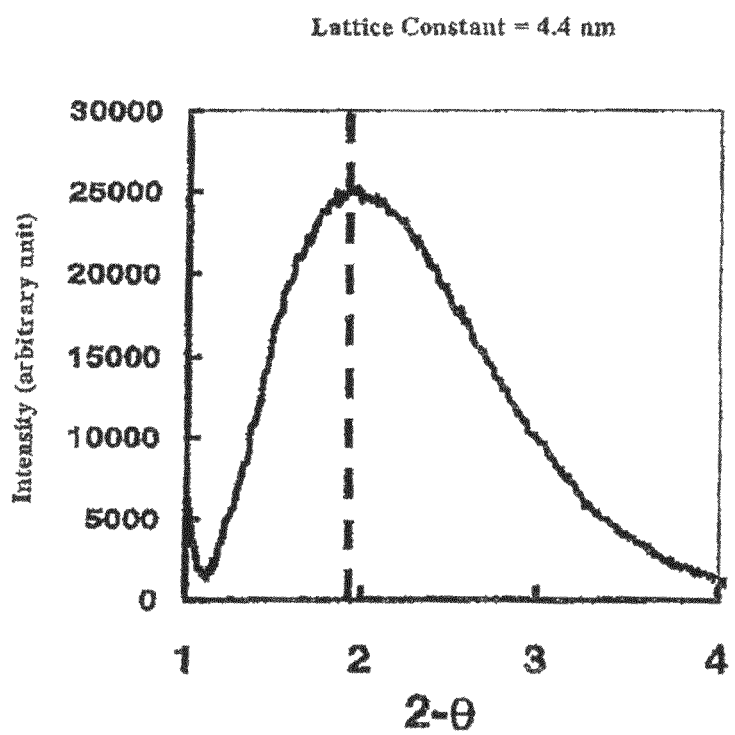

[Fig. 4]
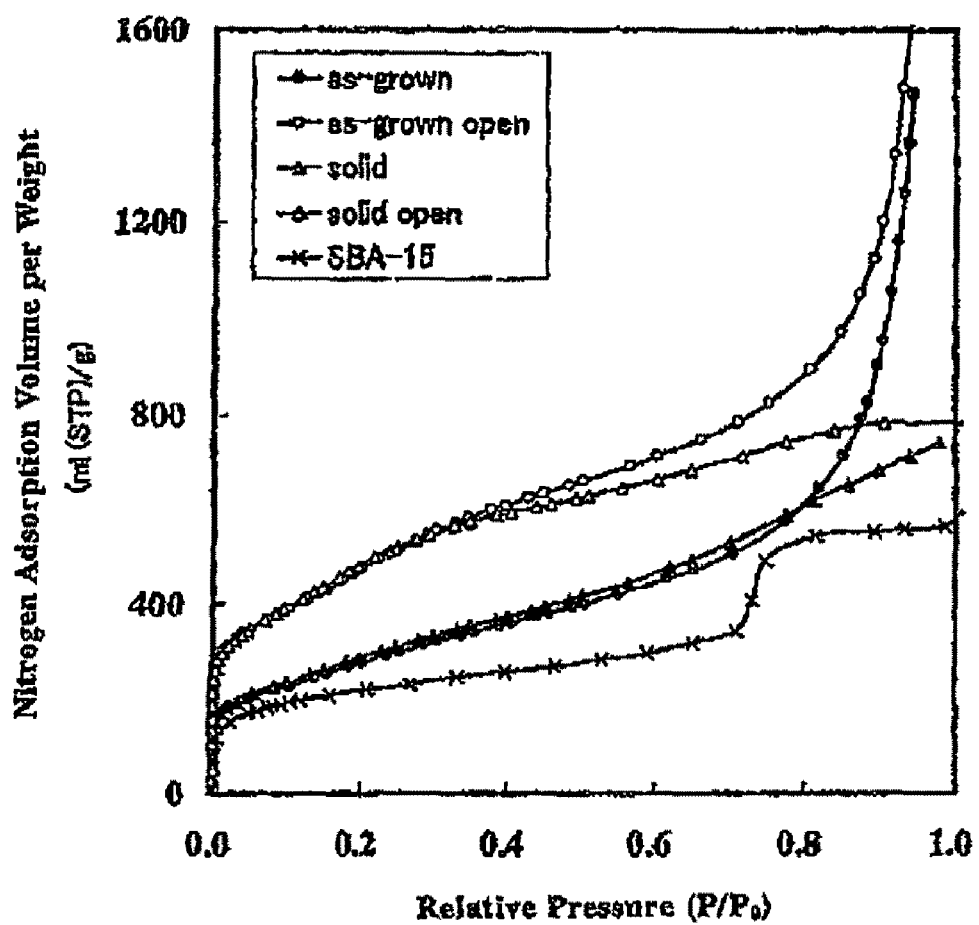

[Fig. 5]
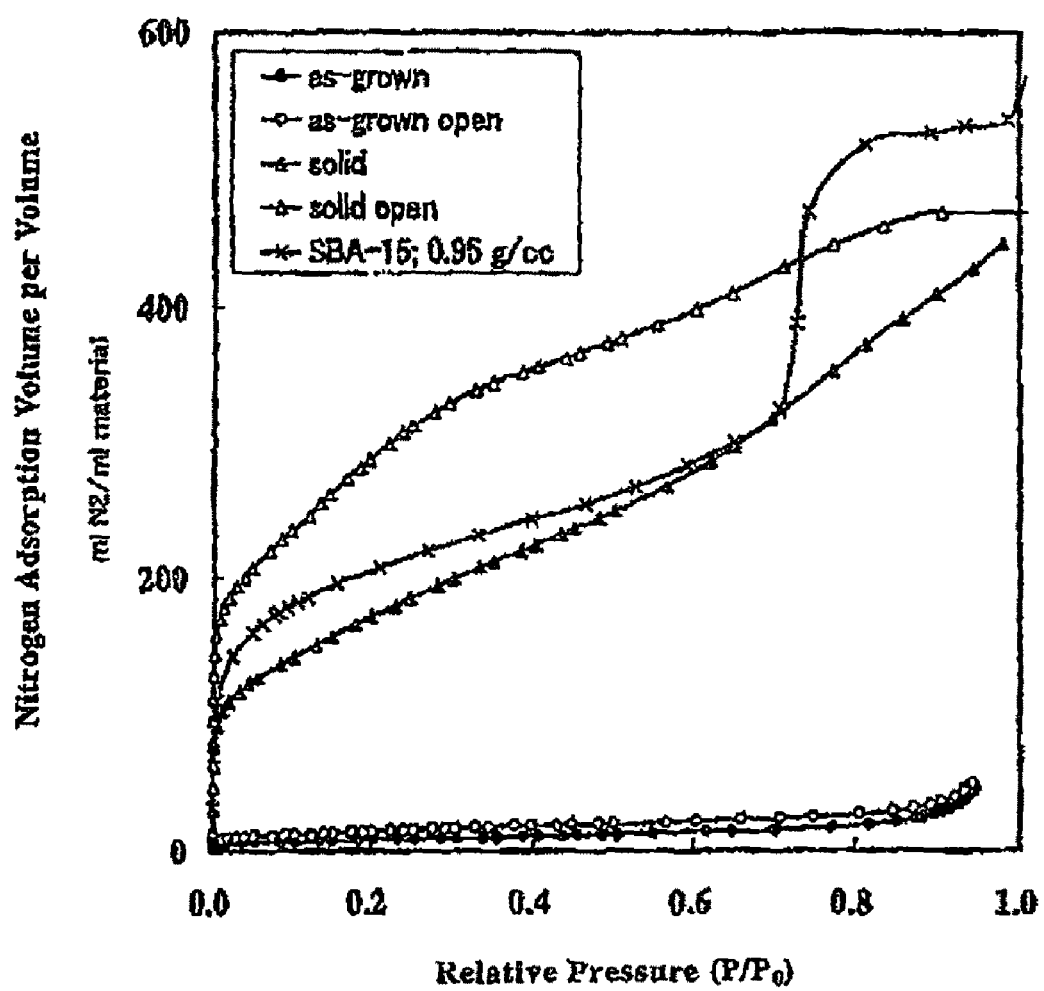

[Fig. 6]
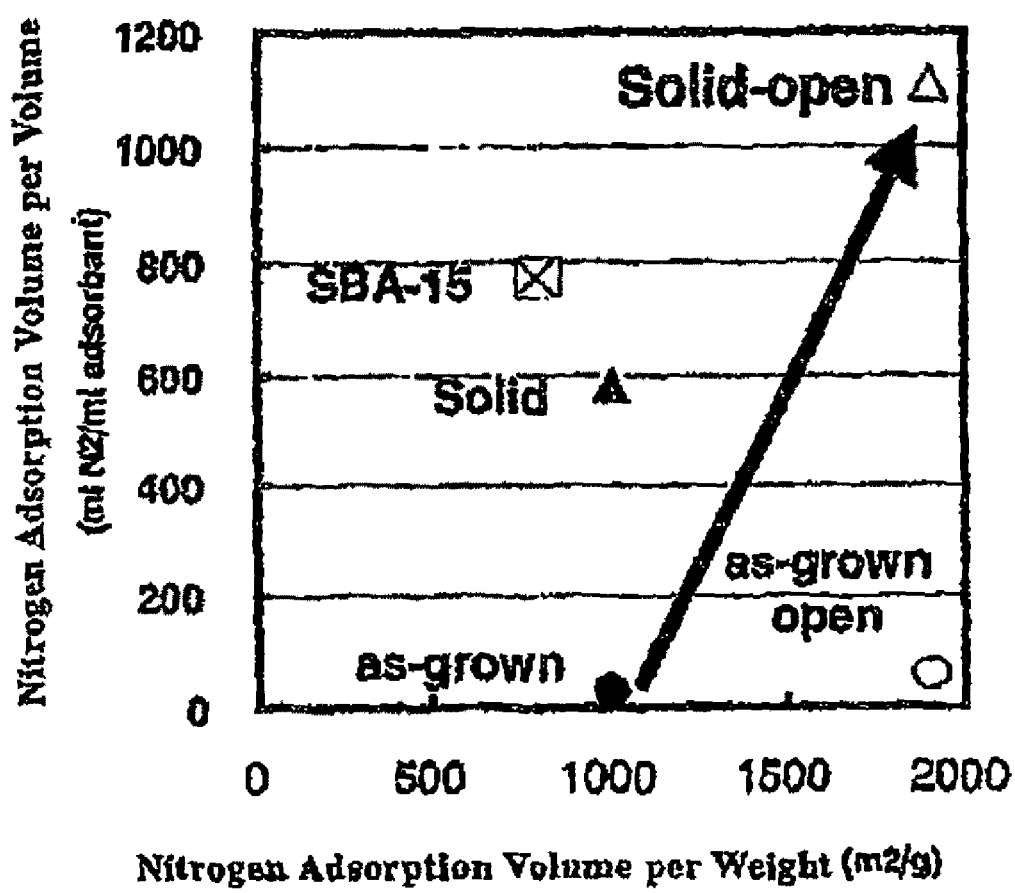

[Fig. 7]
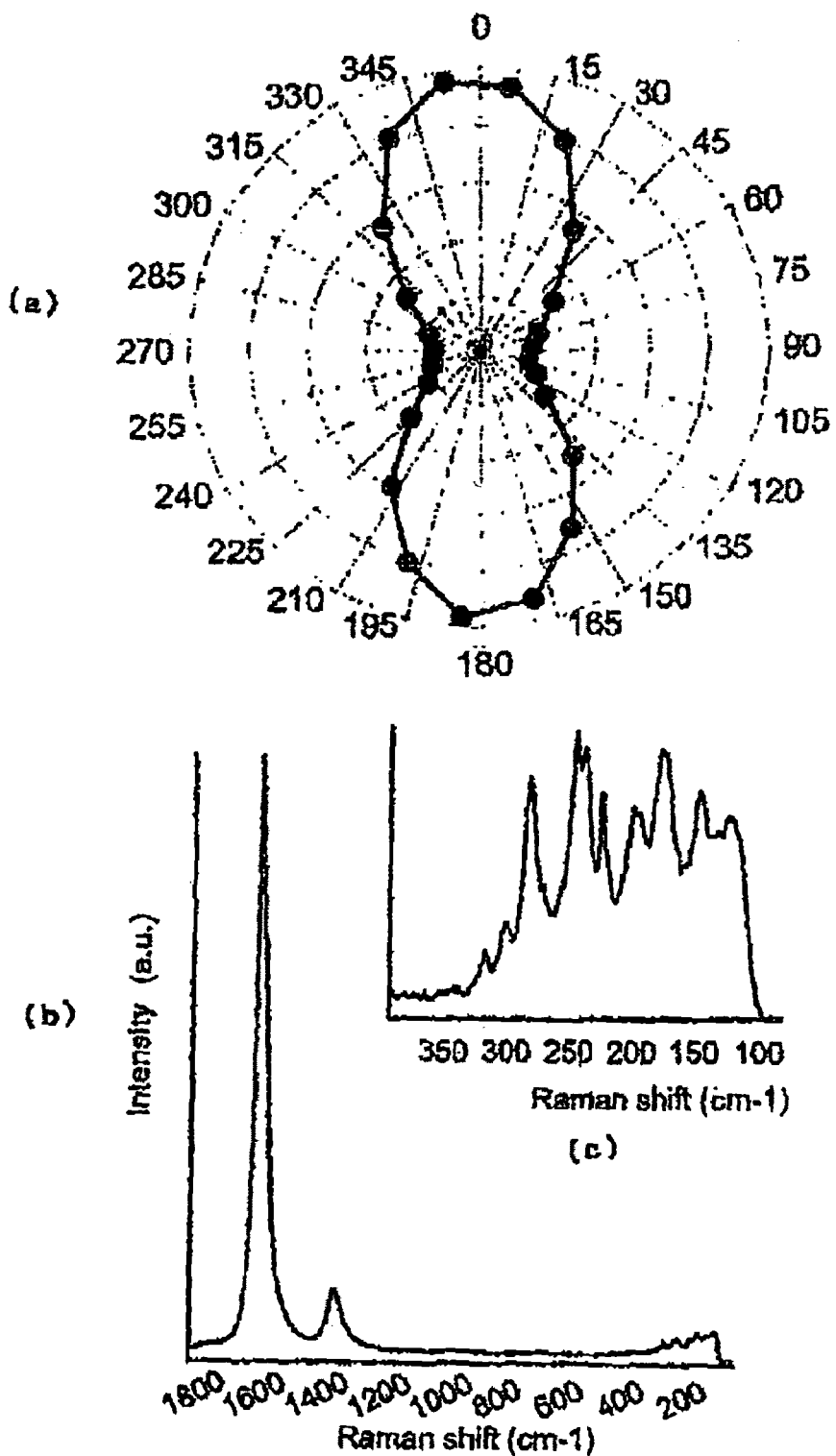

[Fig. 8]
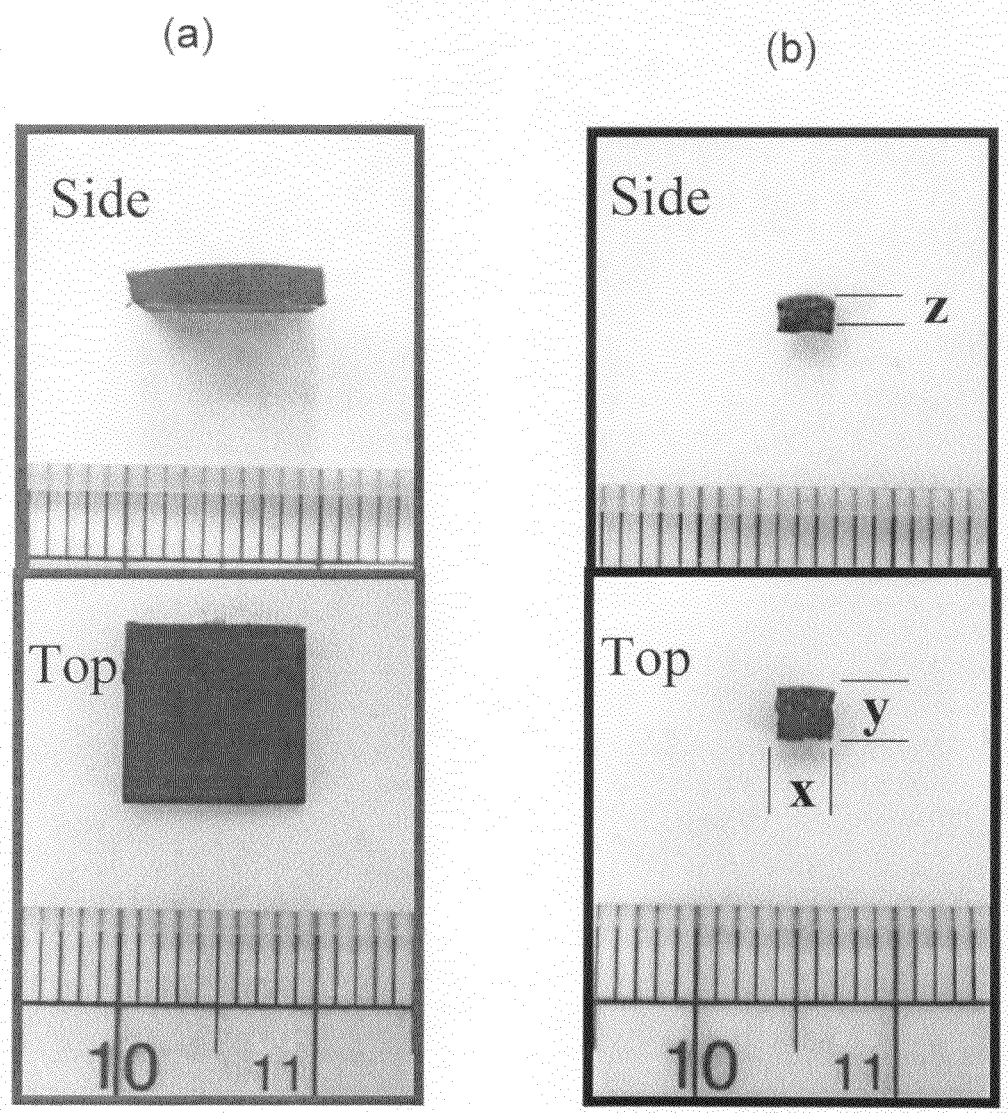

[Fig. 9]
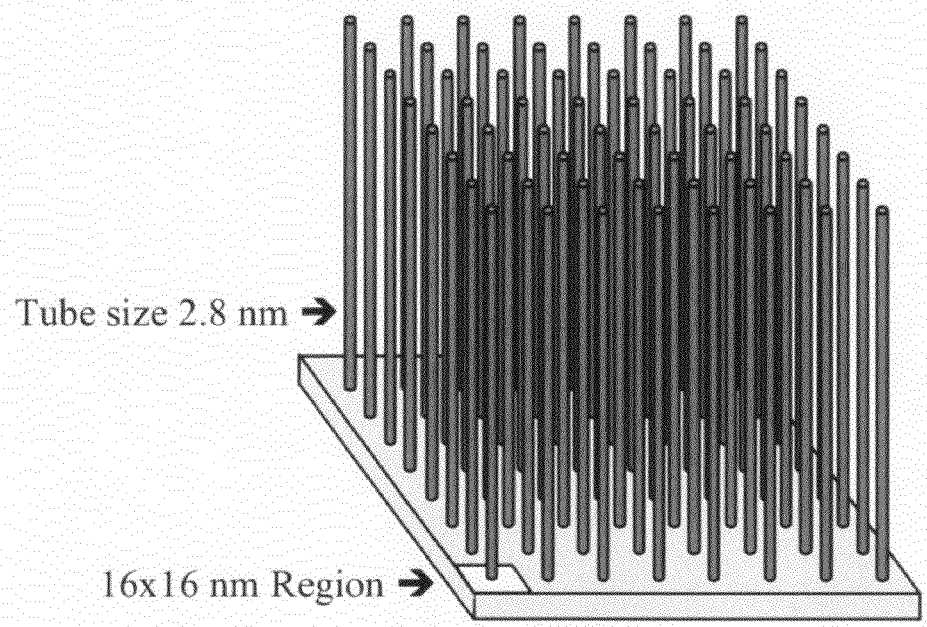
Tube size 2.8 nm →
16×16 nm Region →
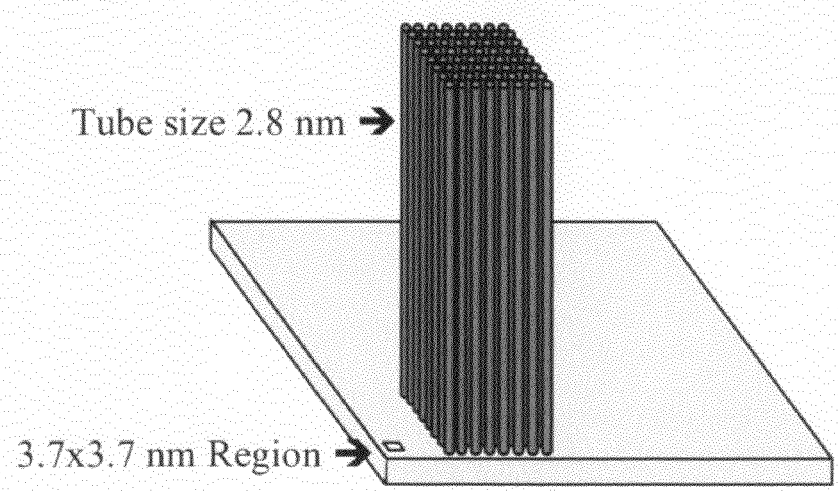
Tube size 2.8 nm →
3.7×3.7 nm Region →

[Fig. 10]
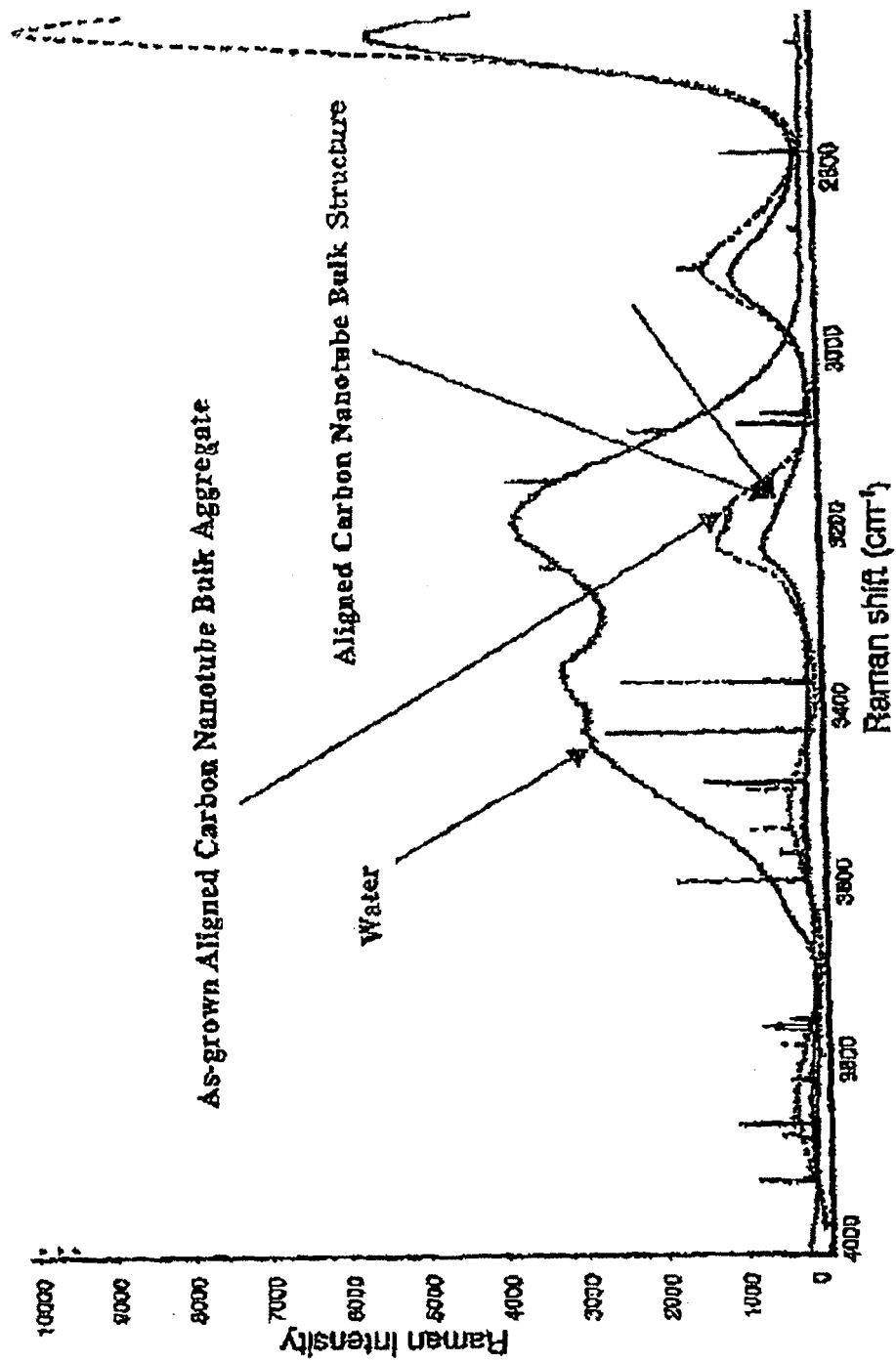

[Fig. 11]
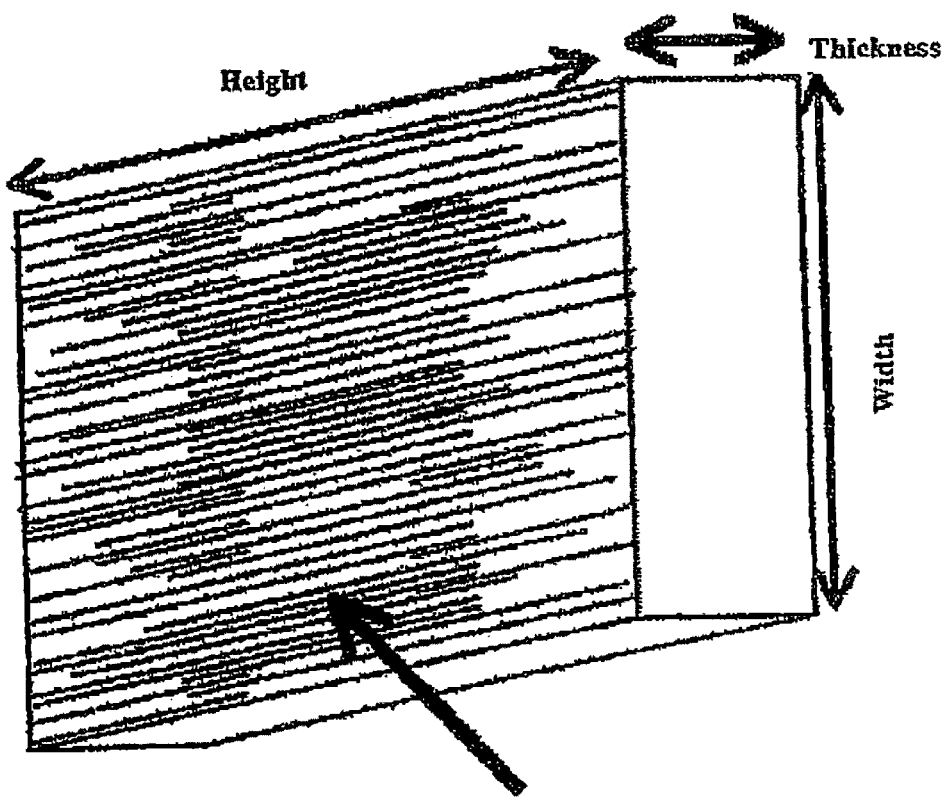

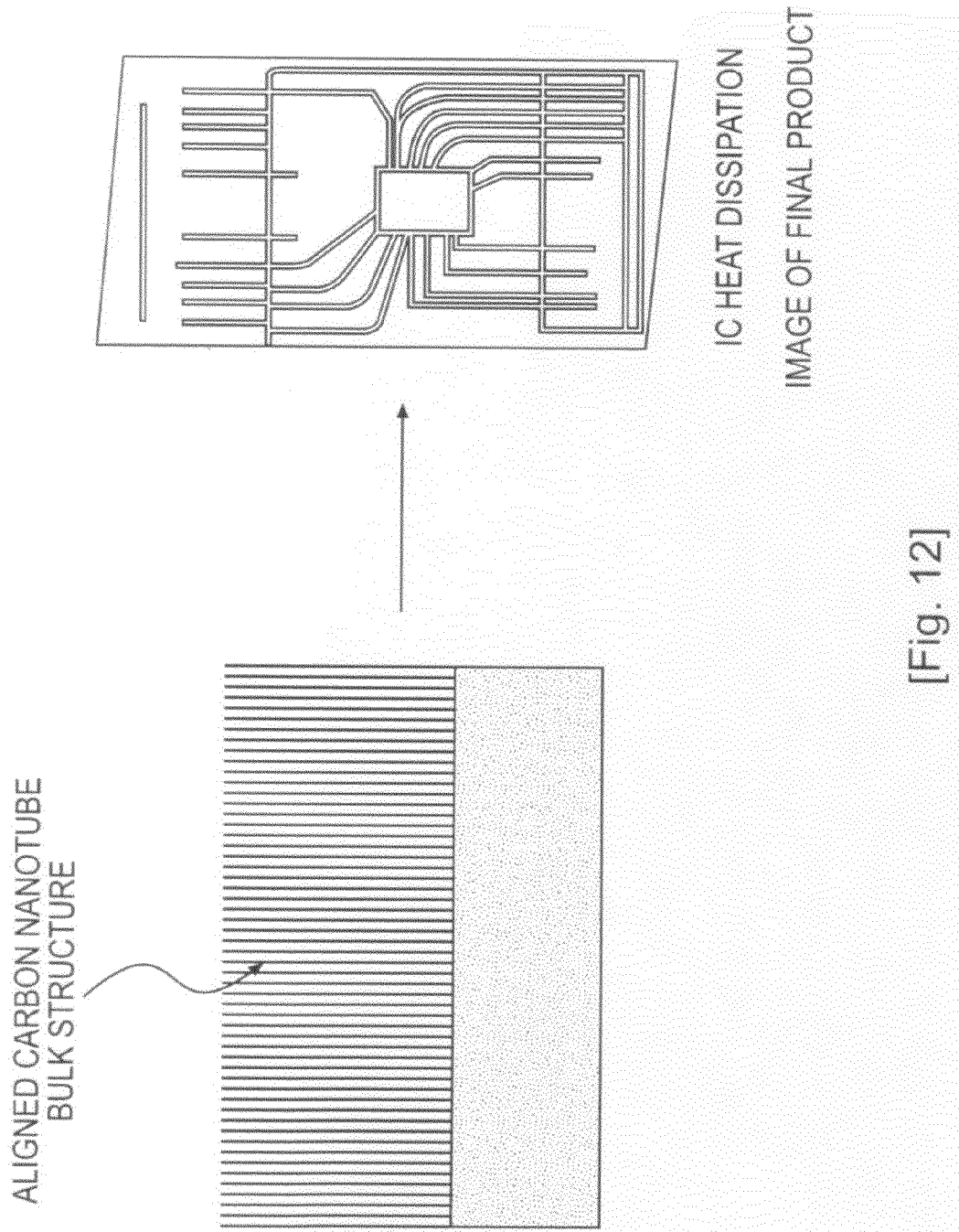
[Fig. 12]

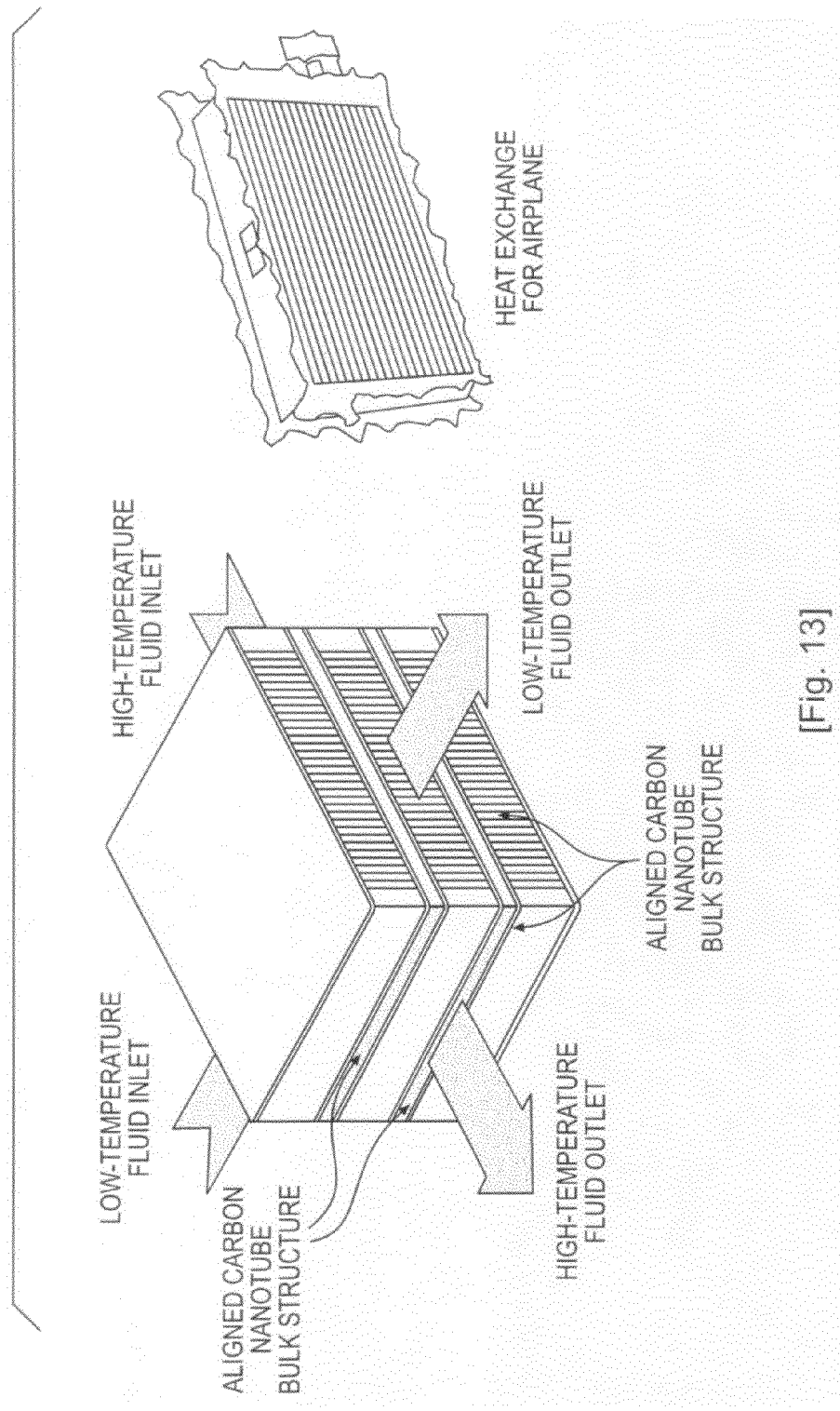

[Fig. 14]
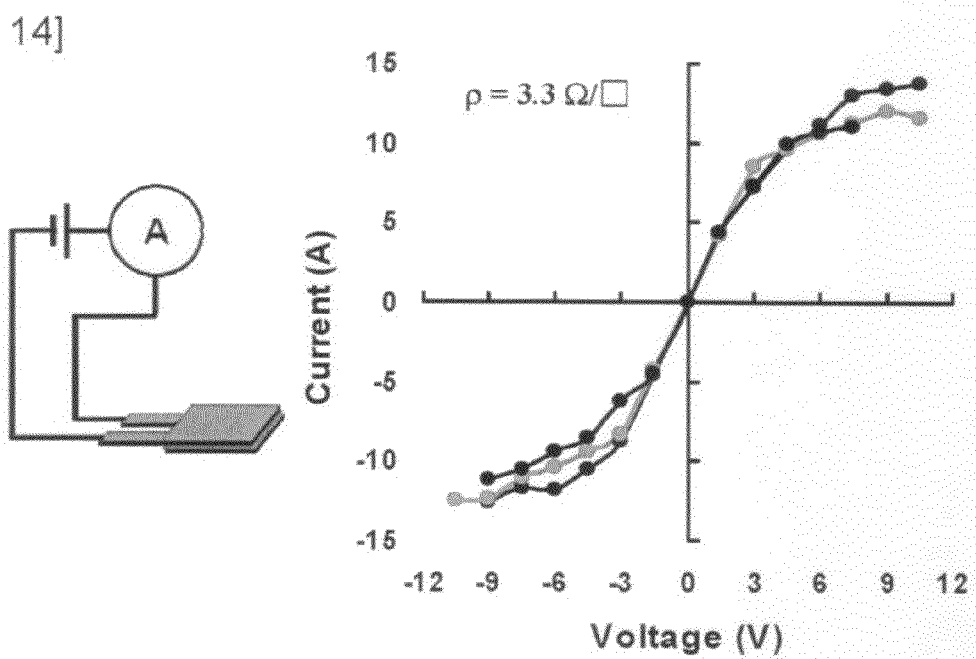

[Fig. 15]
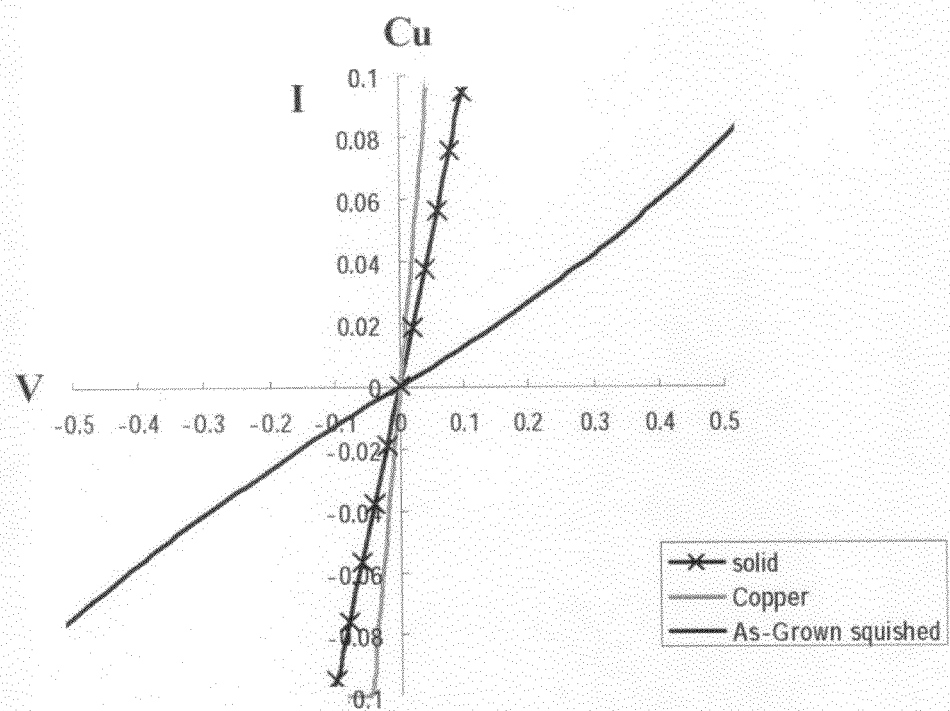

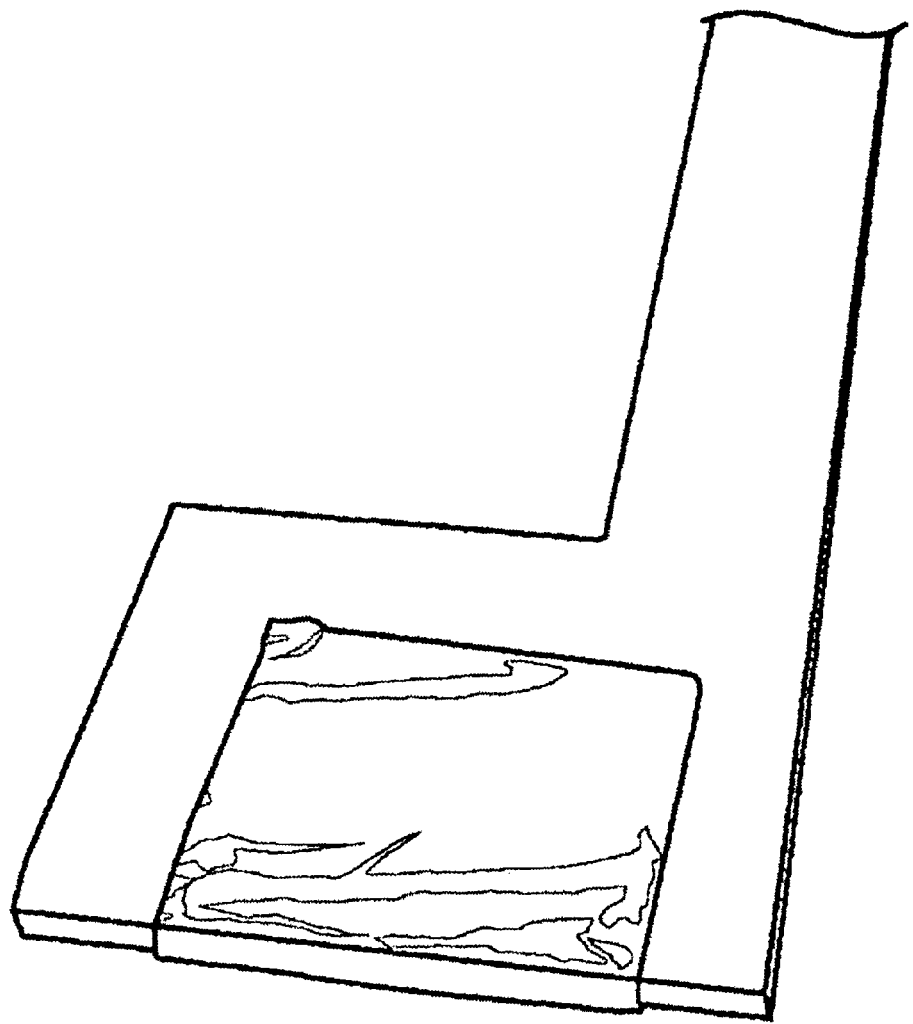
[Fig. 16]

[Fig. 17]
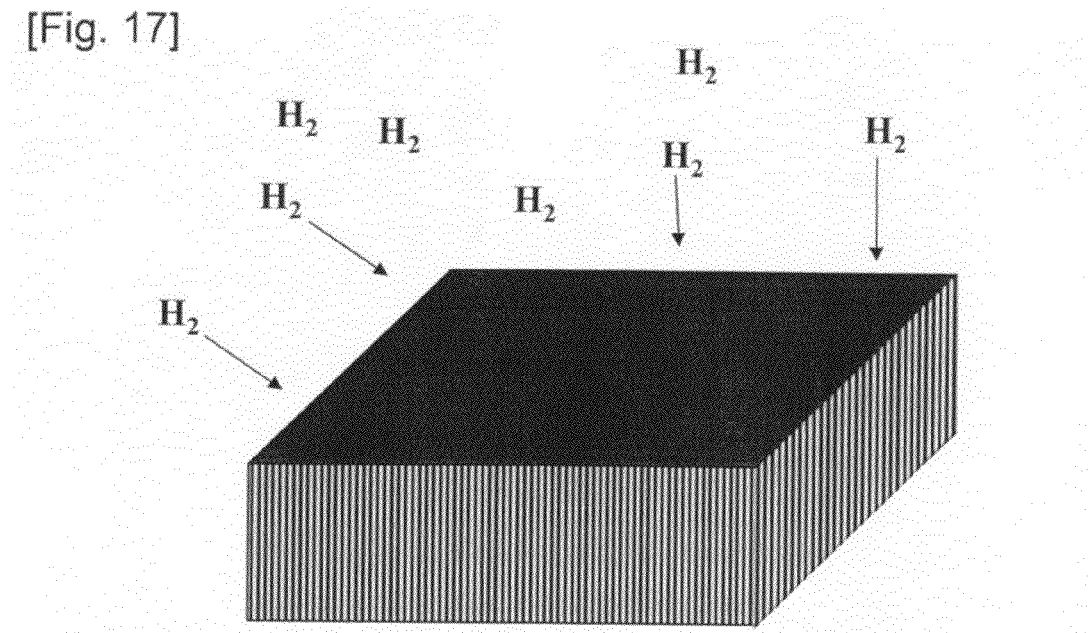
[Fig. 18]
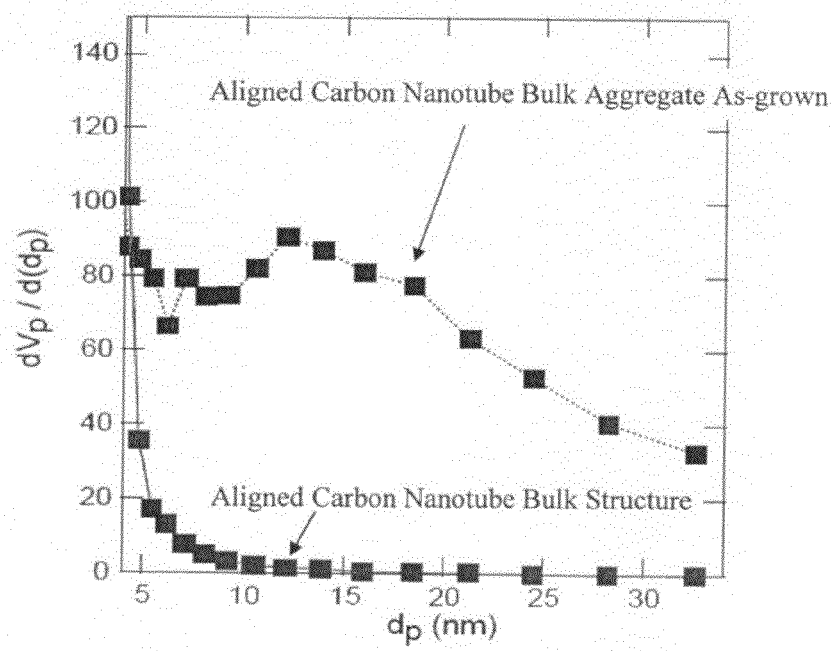

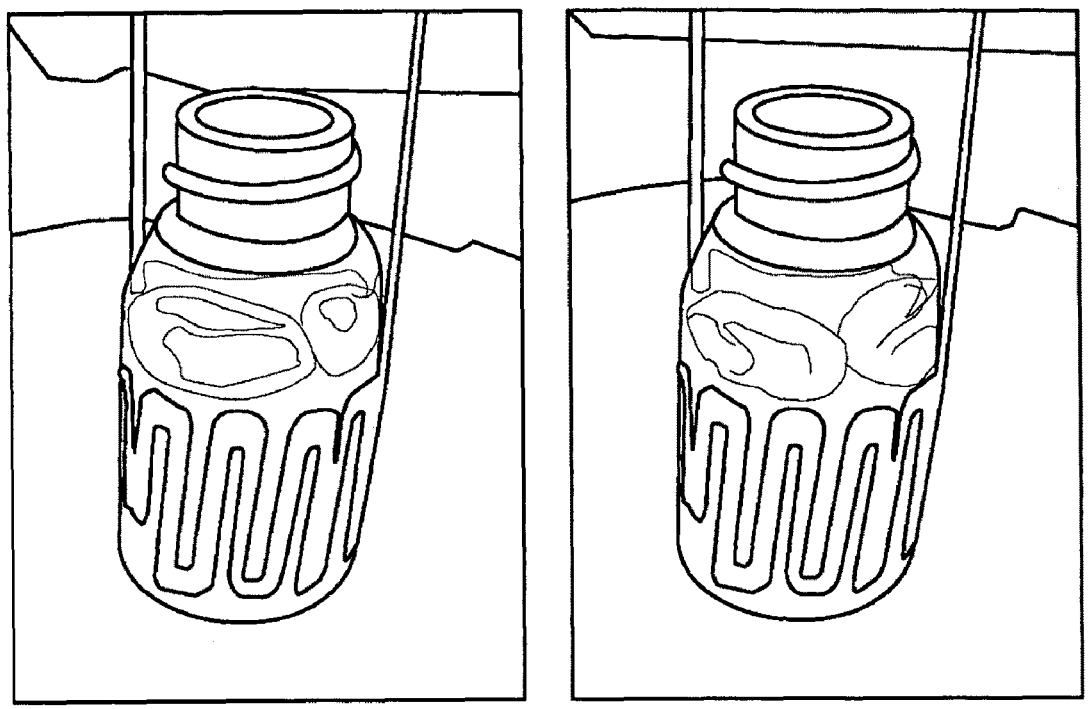
[Fig. 19]

[Fig. 20]
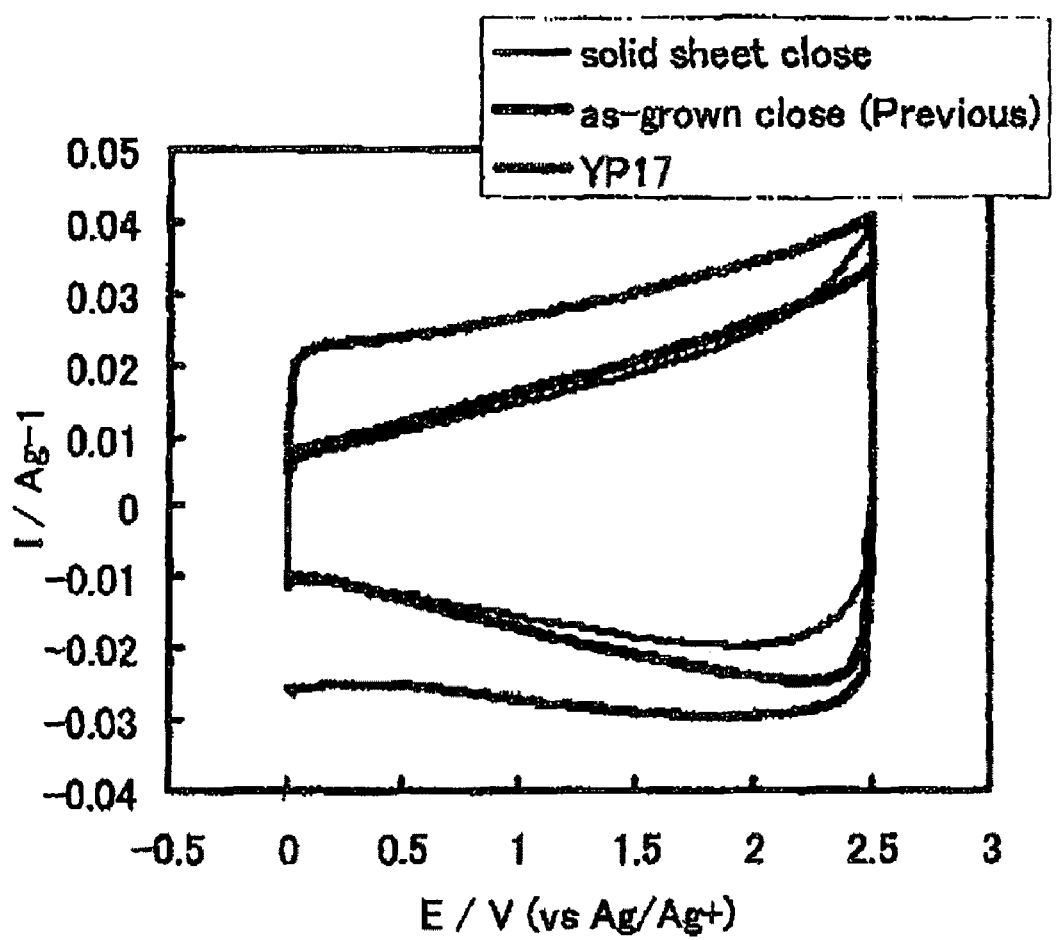

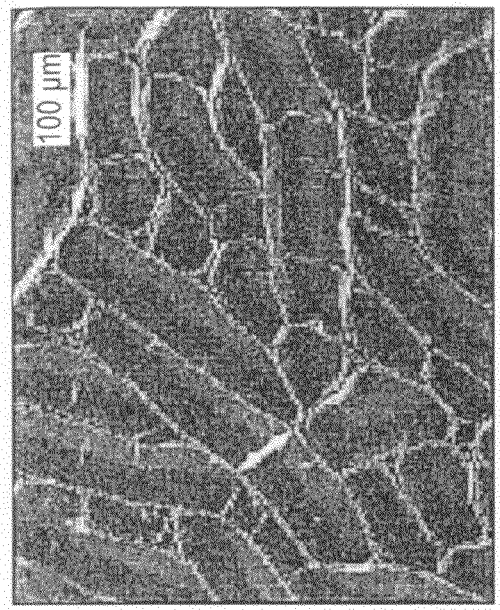
[Fig. 21b]
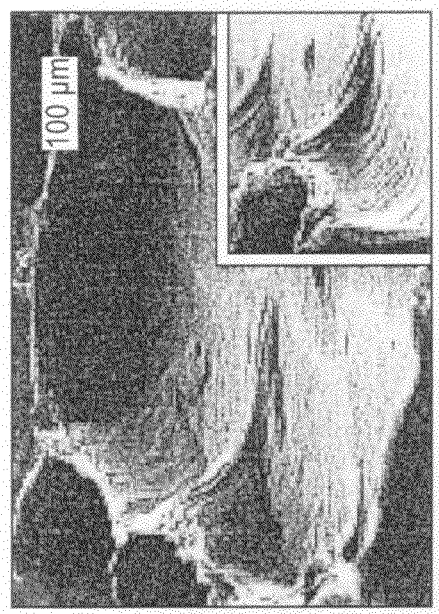
[Fig. 21d]
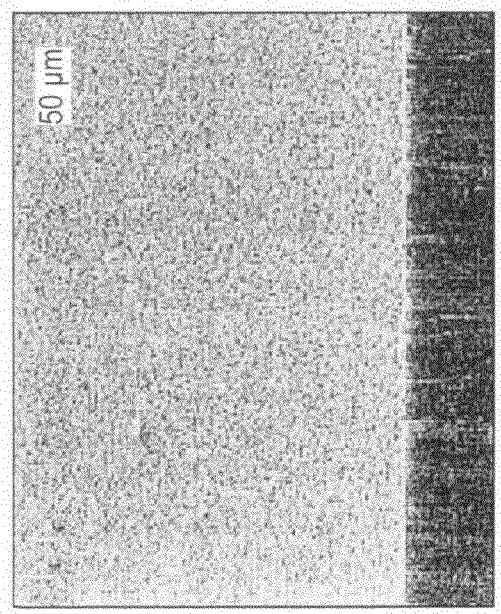
[Fig. 21a]
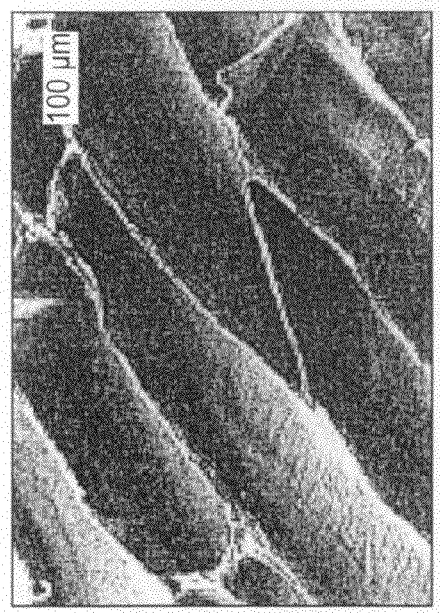
[Fig. 21c]

ALIGNED CARBON NANOTUBE BULK AGGREGATE, PROCESS FOR PRODUCING THE SAME AND USES THEREOF

This application is a Continuation-in-Part of Ser. No. 12/087,450, filed Dec. 3, 2008 now abandoned, which is a 371 application of PCT/JP2007/050050, filed Jan. 5, 2007.

TECHNICAL FIELD

The present invention relates to an aligned carbon nanotube bulk structure. More particularly, the present invention relates to an aligned carbon nanotube bulk structure capable of realizing high density, high hardness, high purity, high specific surface area, high electrical conductivity, large scaling and patterning, an aspect of which has not hitherto been achieved.

BACKGROUND ART

Regarding carbon nanotubes (CNTs) that are expected for development to functional materials as novel electronic device materials, optical materials, electrically conductive materials, biotechnology-related materials and others, energetic investigations of their yield, quality, use, mass productivity and production method are being promoted.

For putting carbon nanotubes into practical use for the above-mentioned functional materials, one method may be taken into consideration, which comprises preparing a bulk aggregate of a large number of carbon nanotubes, large-scaling the size of the bulk aggregate, and improving its properties such as the purity, the specific surface area, the electric conductivity, the density and the hardness to thereby make it patternable in a desired shape. In addition, the mass productivity of carbon nanotubes must be increased greatly.

To solve the above-mentioned problems, the inventors of this application have assiduously studied and, as a result, have found that, in a process of chemical vapor deposition (CVD) where carbon nanotubes are grown in the presence of a metal catalyst, when a very small amount of water vapor is added to the reaction atmosphere, then an aligned carbon nanotube bulk aggregate having a high purity and having extremely large-scaled as compared with that in conventional methods can be obtained, and have reported it in Non-Patent Document 1, etc.

Non-Patent Document 1: Kenji Hata et al., Water-Assisted Highly Efficient Synthesis of Impurity-Free Single-Walled Carbon Nanotubes, SCIENCE, 2004.11.19, Vol. 306, pp. 1362-1364.

DISCLOSURE OF THE INVENTION

Problems to be Solved by the Invention

The aligned carbon nanotube bulk aggregate reported in the above-mentioned Non-Patent Document 1 has, for example, a purity before purification of 99.98 mass % and a specific surface area of about 1000 $m^2/g$, and has a height (length) of about 2.5 mm or so, which comprises a large number of single-walled carbon nanotubes growing as aggregated on a substrate.

However, in order to apply the aligned carbon nanotube bulk aggregate as a functional material having much better properties, its strength and hardness must be further improved since the density of the structure of the above-mentioned report must is about 0.03 $g/cm^3$ or so and it is mechanically brittle. In addition, there is room for further investigation of the structure in point of the handlability and the workability thereof.

Particularly, an aligned carbon nanotube bulk aggregate having a high surface area, in which a plurality of CNTs aligned in a predetermined direction are filled at a high density, and having desired form and shape is extremely suitable to various kinds of application uses such as electrodes for super capacitors and heat conduction and heat dissipation materials having directionality as substance and energy storing materials.

With the background described above, an object of the present invention is to provide an aligned carbon nanotube bulk structure having high purity, high specific surface area, and high electric conductivity, also excellent in mass productivity and capable of attaining large scaling by simple and convenient means not found so far by applying a density-increasing treatment of exposing an aligned carbon nanotube bulk aggregate to a liquid and the drying the same while maintaining the alignment direction of the CNTs.

Even when an aligned carbon nanotube bulk aggregate merely grown on a substrate is exposed to a liquid and then dried, the density is increased in a not uniform island form as shown in FIGS. 21(b), (c), (d) (refer to Nirupama Chakrapani, et al. Capillarity-driven assembly of two dimensional cellular carbon nanotube foams, Proceedings of the National Academy of Sciences, 2004. 3. 23, vol. 101, p. 4009 to 4012), and an aligned carbon nanotube bulk structure of high density and having a desired shape cannot be formed.

In view of the situation described above, the present invention further intends to provide an aligned carbon nanotube bulk structure of high density and having desired form and shape. Furthermore, the present invention intends to provide an aligned carbon nanotube bulk structure capable of attaining patterning.

For the purpose of solving the foregoing problems, this application provides the following inventions.

[1] An aligned carbon nanotube bulk structure having a plurality of carbon nanotubes (CNTs) applied with a density-increasing treatment and having alignment in a predetermined direction in which a degree of anisotropy between the direction of alignment and the direction vertical to said direction in the structure is 1:3 or more, and the intensity by irradiating X-rays along the direction of alignment is higher compared with the intensity by irradiating X-rays from the direction vertical to the direction of alignment at a (002) peak of X-ray diffraction data, and the degree of alignment is defined by at least one of the conditions;

1) in a case of measuring the X-diffraction intensity by irradiating X-rays from a first direction parallel with the longitudinal direction of the CNT and a second direction vertical to the first direction (θ-2θmethod), an angle θ and a reflection azimuth at which the reflection intensity from the second direction is higher than the reflection intensity from the first direction are present, and an angle θ and a reflection azimuth at which the reflection intensity from the first direction is higher than the reflection intensity from the second direction is present, 2) a diffraction peak pattern exhibiting the presence of anisotropy appears in a case of measuring an X-ray diffraction intensity by a 2-dimensional diffraction pattern image obtained by irradiating X-rays from a direction vertical to the longitudinal direction of CNT (Laue method), and 3) a Herman's orientation factor is larger than 0 and smaller than 1 when using the X-ray diffraction intensity obtained according to the θ-2θ method or the Laue method.

[2] An aligned carbon nanotube bulk structure according to the above (1), wherein the structure has a weight density of 0.1 to 1.5 g/cm$^3$ and a specific surface area of 600 to 2600 m$^2$/g.

[3] An aligned carbon nanotube bulk structure according to the above (1), wherein the spacing between neighboring CNTs adjacent to each other is 10 nm or less.

[4] An aligned carbon nanotube bulk structure according to the above (1), wherein the density is increased in the direction of the thickness.

EFFECT OF THE INVENTION

The aligned carbon nanotube bulk structure of the present invention is an unprecedented high-strength aligned carbon nanotube bulk structure, of which the density is at least about 20 times that of the aligned carbon nanotube bulk aggregate that the inventors of this application proposed in Non-Patent Reference 1, and is extremely high (at least 0.1 g/cm$^3$), and of which the hardness is at least about 100 times that of the previous one and is extremely large; and this is not a material having a soft feeling but is a novel material that exhibits a phase of so-called "solid".

The aligned carbon nanotube bulk structure of the present invention is a highly purified one and its contamination with catalyst and side product is inhibited. Its specific surface area is from 600 to 2600 m$^2$/g or so, and is on the same level as that of typical porous materials, activated carbon and SBA-15. Though ordinary porous materials are insulators, the aligned carbon nanotube bulk structure of the invention has high electric conductivity and, when formed into a sheet, it is flexible. When the aligned carbon nanotube bulk aggregate produced in Non-Patent Document 1 is formed into an aligned carbon nanotube bulk structure, then a material having a carbon purity of at least 99.98% could be produced.

The aligned carbon nanotube bulk structure of the present invention has excellent handlability and workability, and can be readily worked into any desired shape.

The aligned carbon nanotube bulk structure of the present invention has excellent properties of purity, density, hardness, specific surface area electric conductivity and workability, and can be large-scaled, and therefore has various applications for heat dissipation materials, heat conductors, electric conductors, electrode materials, batteries, capacitors, supercapacitors, adsorbents, gas storages, flexible heaters, etc.

Further, according to the process for producing the aligned carbon nanotube bulk structure of the present invention, the aligned carbon nanotube bulk structure having the above-mentioned excellent properties can be produced with high mass-productivity in a simplified manner with chemical vapor deposition (CVD).

BRIEF DESCRIPTION OF THE DRAWINGS

FIG. 1 shows electron microscopic (SEM) images of an aligned carbon nanotube bulk structure.

FIG. 2 shows X-ray diffraction data of an aligned carbon nanotube bulk structure.

FIG. 3 shows an example of low-angle X-ray diffraction data in a case where an aligned carbon nanotube bulk structure is irradiated with X rays in the direction vertical to the alignment direction.

FIG. 4 shows liquid nitrogen adsorption/desorption isothermal curves of an aligned carbon nanotube bulk structure.

FIG. 5 shows the adsorption amount per unit volume of an aligned carbon nanotube bulk structure.

FIG. 6 shows a relation between the adsorption amount per unit volume of an aligned carbon nanotube bulk structure and the specific surface area per unit weight thereof.

FIG. 7 shows examples of Raman spectrometry of an aligned carbon nanotube bulk structure.

FIG. 8 shows the appearance of plural aligned carbon nanotubes before exposure to liquid and after exposure to liquid followed by drying.

FIG. 9 shows images indicating the change the appearance of plural aligned carbon nanotubes before exposure to liquid and after exposure to liquid followed by drying.

FIG. 10 shows Raman spectrum data after exposure of plural aligned carbon nanotubes to water followed by drying them.

FIG. 11 is a model showing the shape control of an aligned carbon nanotube bulk structure.

FIG. 12 is a schematic view showing one example of a heat dissipation material comprising an aligned carbon nanotube bulk structure.

FIG. 13 is a schematic view showing one example of a heat exchanger comprising an aligned carbon nanotube bulk structure.

FIG. 14 shows current/voltage characteristics of an aligned carbon nanotube bulk structure (to which a high current is applied).

FIG. 15 shows current/voltage characteristics of an aligned carbon nanotube bulk structure (to which a low current is applied).

FIG. 16 is a schematic view showing one example of a supercapacitor comprising an aligned carbon nanotube bulk structure.

FIG. 17 is a conceptual view schematically showing a case of application of an aligned carbon nanotube bulk structure to a hydrogen storage.

FIG. 18 shows micropores distribution obtained by BJH method.

FIG. 19 shows flexible electroconductive heaters comprising an aligned carbon nanotube bulk structure.

FIG. 20 shows cyclic voltamography data in a case of application of an aligned carbon nanotube bulk structure to a supercapacitor.

FIG. 21 is a view showing the state of exposing a bulk CNT aggregate to a liquid, in which FIG. 21(a) represents a bulk CNT aggregate aligned vertically on a substrate, and FIGS. 21(b), (c), (d) show the state thereof increased in the density into an island shape by different magnification factors.

BEST MODE FOR CARRYING OUT THE INVENTION

The present invention has the above-mentioned characteristics, and its embodiments will be described hereinunder.

The density of the aligned carbon nanotube bulk structure obtained by applying the density-increasing treatment is to be described below.

When the compression ratio of an aligned carbon nanotube bulk structure in a density-increasing step as: (compression ratio=original thickness÷thickness after density increase), the weight density of the aligned carbon nanotube bulk structure after increasing the density is expressed as: (CNT density=compression ratio×density before compression).

The aligned carbon nanotube bulk structure of the invention has a weight density of 0.1 g/cm$^3$ or more and the aligned carbon nanotube bulk structure sufficiently keeps desired properties and can be patterned in the same manner as in each of the examples described above. On the contrary, in a case of the aligned carbon nanotube bulk aggregate before the increasing the density described above (weight density: 0.029 g/cm³), known etching or lithography could not be applied substantially due to insufficient adhesion with the substrate and corrosion of the resist.

For the uppermost limit of the weight density of the aligned carbon nanotube bulk structure that can be controlled in the invention, a weight density in a wider range can be attained in principle by controlling the diameter of CNT. Assuming that all CNTs have an equal diameter and all CNTs are closely packed by the density-increasing step, it can be easily calculated that the CNT density after increasing the density is increased more as the diametrical size of CNT is smaller. While the average diameter of CNTs of the aligned carbon nanotube bulk structure used in each of the examples described above is about 2.8 nm, the weight density when the CNTs are the closely packed is about 0.78 g/cm³. In this regard, it has been known that the diameter of CNT can be made smaller (about 1.0 nm) by using the technique already reported in the non-patent document (Ya-Qiong Xu, et al. Vertical Array Growth of Small Diameter Single-Walled Carbon Nanotubes, J. Am. Chem. Soc., 128 (20), pp 6560 to 6561, 2006). In view of the above, it is considered that the weight density can be increased to about 1.5 g/cm³ at the maximum by making the CNT diameter smaller.

The aligned carbon nanotube bulk structure of the present invention is characterized in that the plural carbon nanotubes therein aggregate together, the neighboring carbon nanotubes strongly adhere to each other by van der Waals force, and these carbon nanotubes are aligned in a predetermined direction, and that the lowermost limit of the density of the structure is 0.1 g/m³, preferably 0.3 g/m³, more preferably 0.4 g/m³, and the uppermost limit of the density thereof is 1.0 g/m³, preferably 1.2 g/m³, more preferably 1.5 g/m³. When the density of the aligned carbon nanotube bulk structure is lower than the above-mentioned range, then the structure is mechanically brittle and could not have sufficient mechanical strength; but when too high, then the specific surface area of the structure may decrease. The aligned carbon nanotube bulk structure having a density within the range is not a material having a soft feeling like the aligned carbon nanotube bulk aggregate produced in Non-Patent Document 1, but has a phase of so-called "solid". FIG. 1 shows an electron microscopic (SEM) image (a) of an aligned carbon nanotube bulk structure of the present invention, as compared with a photographic image (b) of an aligned carbon nanotube bulk aggregate produced in Non-Patent Document 1 (hereinafter this may be referred to as previously-proposed aligned carbon nanotube bulk aggregate). In this example, the density of the aligned carbon nanotube bulk structure of the present invention is about 20 times larger than the density of the previously-proposed aligned carbon nanotube bulk aggregate.

The definition for the alignment and the degree of alignment of the aligned carbon nanotube bulk structure obtained by applying the density-increasing treatment are to be described below.

In a case where individual CNTs constituting a CNT aggregate are aligned in a regular direction, the directionality for the function of the individual CNTs can be made uniform and, as a result, an aligned carbon nanotube bulk structure of high function can be obtained. That is, the aligned carbon nanotube bulk structure of the invention in which individual CNTs are aligned in a regular direction shows higher directionality for the transmission property in view of the alignment direction when compared with a CNT aggregate in which the direction of individual CNTs is irregular, that is, not aligned. By virtue of the high directionality, the aligned carbon nanotube bulk structure exhibits better electric property (for example, higher electric conductivity), better mechanical property (for example, higher strength), and better thermal property (for example, higher heat conductivity). Further, the property of the aligned carbon nanotube bulk structure which is different between the aligned direction and other direction, that is, the anisotropy is effective, for example, in a case where heat or the like is intended to be diffused or discharged selectively in a desired direction and this is suitable for an application use such as a heat conduction material. Further, since ions can easily diffuse between each of aligned CNTs, this is useful also as an electrode material for a high power super capacitor.

Alignment of the aligned carbon nanotube bulk structure can be evaluated by at least one of the following methods 1 to 3.

1. In a case of measuring an X-ray diffraction intensity by irradiating X-rays from a first direction parallel with the longitudinal direction of CNTs and a second direction vertical to the first direction (θ-2θmethod), angle θ and reflection azimuth at which the reflection intensity from the second direction is higher than the reflection intensity from the first direction are present, and angle θ and reflection azimuth at which the reflection intensity from the first direction is higher than the reflection intensity from the second direction.

2. In a case of measuring an X-ray diffraction intensity on a 2-dimensional diffraction pattern image obtained by irradiating X-rays from the direction vertical to the longitudinal direction of CNTs (Laue method), a diffraction peak pattern exhibiting the presence of anisotropy appears.

3. A Herman's orientation factor is greater than 0 and smaller than 1 and, more preferably, greater than 0.25 or more and 1 or less when using the X-ray diffraction intensity obtained by the θ-2θ method or the Laue method.

Further, it is also characterized in that the degree of the diffraction peak intensity of the (CP) diffraction peak and a (002) peak attributable to packing between single-walled CNTs and the diffraction peak intensities of the (100),(110) peaks attributable to the carbon six-membered ring structure constituting the CNT are different between the parallel and vertical incident directions. For detailed description of the experiment, a patent document (U.S. Ser. No. 12/318,443) or (U.S. Ser. No. 11/658,577) may be referred to for instance.

CNTs in the aligned carbon nanotube bulk structure having such properties are aligned.

Further, the degree of alignment of the aligned nanotube bulk structure is evaluated, for example, based on the Herman's orientation factor.

The Herman's orientation factor F is defined by the following formulae:

$$F \equiv \frac{1}{2}(3\langle\cos^2\phi\rangle - 1) \qquad \text{[Formula 1]}$$

$$\langle\cos^2\phi\rangle = \frac{\int_0^{\pi/2} I(\phi)\cos^2\phi\sin\phi\, d\phi}{\int_0^{\pi/2} I(\phi)\sin\phi\, d\phi}$$

in which $\phi$ represents an azimuthal angle with $\phi=0$ being as a reference azimuth, and $I(\phi)$ represents a diffraction intensity function (intensity profile). It is preferred to define the aligned direction as the reference azimuth which is the direction where the Herman's orientation factor is at the maximum.

For the Herman's orientation factor, F=1 in a case of complete alignment and F=0 in a case of non-alignment for the direction: $\phi=0$.

Specifically, the Herman's orientation factor may be calculated by using an X-ray diffraction intensity obtained according to the θ-2θ method or the Laue method, or a diffraction intensity function (intensity profile) obtained from an image obtained by Fast Fourier Transformation of an SEM image or an atomic force microscope (hereinafter also referred to as AFM) image.

The orientation property can be quantitatively evaluated also by calculating the Herman's orientation factor using, as a variant, a transformation intensity in the FFT image based on the SEM image, etc. for the aligned CNT structure. In this case, the transformation intensity is determined from the reference direction ($\phi=0$) to $\phi=\pi/2$ in the direction of the moving diameter while keeping an equal distance from the original point of the FFT image and this is defined as a diffraction intensity function. The diffraction intensity function exhibits the degree of the periodicity corresponding to the distance from the original point in the direction of the azimuthal angle. The degree of alignment in the reference direction can be evaluated quantitatively by calculating the formula described above using the diffraction intensity function as a variant. For the details of the calculation, the patent document [U.S. Ser. No. 12/318,443] or [U.S. Ser. No. 11/658,577] may be referred to for instance.

In the aligned carbon nanotube bulk structure, it is desired that the Herman's factor is more than 0 and less than 1, more preferably, 0.25 or more and 1 or less. An aligned carbon nanotube bulk structure within the range of alignment shows good electric property, good mechanical property, and good thermal property, has large specific surface area, favorable integrity, can be handled easily, and also has good shape workability. In addition, it also shows sufficient thermodynamical, electric, or mechanical anisotropy and is suitable to various application uses.

On the contrary, an aligned carbon nanotube bulk structure having the Herman's orientation factor of less than 0 exhibits no degree of alignment. Further, in those having a Herman's orientation factor of less than 0.25, inclination of CNT is 45° and the effect of alignment is decreased. An aligned CNT structure having the Herman's orientation factor of 1 is completely aligned.

FIG. 2 shows X-ray diffraction data of an aligned carbon nanotube bulk structure of the present invention. In the drawing, L indicates the data of the aligned carbon nanotube bulk structure irradiated with X rays in the alignment direction; and T indicates the data thereof irradiated with X rays in the direction vertical to the alignment direction. Samples were so produced that the thickness of the aligned carbon nanotube bulk structure is the same both in the T direction and the L direction, and compared with each other. The intensity ratio of the (100), (110) and (002) diffraction peaks in the L direction and the T direction of the X-ray diffraction data confirms good alignment. Regarding the (100) and (110) peaks, the intensity is higher in the case of X ray irradiation in the direction vertical to the alignment direction (T direction) than in the case of X ray irradiation in the alignment direction (L direction); and the intensity ratio is, for example, in the case of FIG. 2, 5:1 at both the (100) peak and the (110) peak. This is because, in the case of X ray irradiation in the direction vertical to the alignment direction (T direction), the graphite lattices constituting carbon nanotubes are seen. On the contrary, in the case of the (002) peak by X ray irradiation in the alignment direction (L direction), the intensity is higher than that in the case of X ray irradiation in the direction vertical to the alignment direction (T direction); and the intensity ratio is, for example, in the case of FIG. 2, 17:1. This is because, in the case of X ray irradiation in the alignment direction (L direction), the contact points of carbon nanotubes are seen.

The result described above exhibits that the CNTs constituting the aligned carbon nanotube bulk structure are aligned. Further, distinct anisotropy shown by the (002) peak exhibits that CNTs are adjacent to each other, that is, CNTs are filled at a high density.

FIG. 3 shows an example of low-angle X-ray diffraction data in a case where an aligned carbon nanotube bulk structure of the present invention is irradiated with X rays in the alignment direction (L direction). It is known that the case of this example is a structure having a lattice constant of about 4.4 nm.

This exhibits that an average spacing between each of neighboring CNTs is 4.4 nm, and that CNTs in the carbon nanotube bulk structure are filled at a high density.

The aligned carbon nanotube bulk structure of the invention scarcely contains scarce pores or voids at the micro scale and is increased in the density over the entire portion. Whether the aligned carbon nanotube bulk structure is increased in the density or not can be judged depending on the pore diameter. The nanosize pore diameter of the aligned carbon nanotube bulk structure can be determined based on the adsoption/desorption isothermal curves of liquid nitrogen at 77K. As a theoretical formula for determining the distribution of pore diameter, a BJH method that assumes the pore as a cylindrical shape (refer to the Journal of J. Amer. Chem, Soc., Vol 73 (1951), p. 373) may be used. The distribution of pore diameter defined in the present specification is determined according to the BJH method based on the adsorption/desorption isothermal curves of liquid nitrogen at 77K.

In the aligned carbon nanotube bulk structure in which a plurality of aligned CNTs are filled at a high density, the pore diameter determined according to the BJH method is mainly within a range of 10 nm or less.

This exhibits that the spacing (pore) between each of neighboring single-walled CNTs is 10 nm or less, CNTs are filled at a high density in the aligned carbon nanotube bulk structure, and pores or voids at the micro scale are scarcely present.

The carbon nanotubes that constitute the aligned carbon nanotube bulk structure of the present invention may be single-walled carbon nanotubes or double-walled carbon nanotubes, or may also be in the form of a mixture of single-walled carbon nanotubes and double-walled or more multi-walled carbon nanotubes in a suitable ratio.

Regarding the production process for the aligned carbon nanotube bulk structure of the present invention, the structure may be produced according to the process of the invention as mentioned later, and its details are described hereinunder. In case where the aligned carbon nanotube bulk structure obtained according to the process is used in an application in which the purity thereof is taken into consideration, its purity can be preferably at least 98 mass %, more preferably at least 99 mass %, even more preferably at least 99.9 mass %. When the production process that the inventors of this application proposed in Non-Patent Document 1 is utilized, then an aligned carbon nanotube bulk structure having a high purity as above can be obtained even though it is not processed for purification. The aligned carbon nanotube bulk structure having such a high purity contains few impurities, and therefore it may exhibit the properties intrinsic to carbon nanotubes.

The purity as referred to in this description is represented by mass % of carbon nanotubes in a product. The impurity may be obtained from the data of elementary analysis with fluorescent X rays.

A preferred range of the height (length: dimension of carbon nanotubes in the lengthwise direction) of the aligned carbon nanotube bulk structure of the present invention varies, depending on the application thereof. In case where it is used as a large-scaled one, the lowermost limit of the range is preferably 5 μm, more preferably 10 μm, even more preferably 20 μm; and the uppermost limit thereof is preferably 2.5 mm, more preferably 1 cm, even more preferably 10 cm.

The aligned carbon nanotube bulk structure of the present invention has an extremely large specific surface area, and its preferred value varies depending on the use of the structure. For applications that require a large specific surface area, the specific surface area is preferably from 600 to 2600 $m^2/g$, more preferably from 800 to 2600 $m^2/g$, even more preferably from 1000 to 2600 $m^2/g$. The carbon nanotube material of the present invention that is unopened preferably has a specific surface area of from 600 to 1300 $m^2/g$, more preferably from 800 to 1300 $m^2/g$, even more preferably from 1000 to 1300 $m^2/g$. The carbon nanotube material of the present invention that is opened preferably has a specific surface area of from 1300 to 2600 $m^2/g$, more preferably from 1500 to 2600 $m^2/g$, even more preferably from 1700 to 2600 $m^2/g$.

The specific surface area may be determined through computation of adsorption/desorption isothermal curves. One example is described with reference to 50 mg of an aligned carbon nanotube bulk aggregate of the present invention. Using BELSORP-MINI (manufactured by Bell Japan, Inc.), liquid nitrogen adsorption/desorption isothermal curves were drawn at 77 K (see FIG. 4). (The adsorption equilibrium time was 600 seconds). The specific surface area was computed from the adsorption/desorption isothermal curves, and it was about 1100 $m^2/g$. In the relative pressure region of at most 0.5, the adsorption/desorption isothermal curves showed linearity, and this confirms that the carbon nanotubes in the aligned carbon nanotube bulk structure are unopened.

When the aligned carbon nanotube bulk structure of the present invention is processed for opening, then the top end of the carbon nanotube is opened to thereby increase the specific surface area thereof. In FIG. 4, ▲ indicates the data of an unopened aligned carbon nanotube bulk structure of the present invention; Δ indicates the data of an opened one thereof; ● indicates the data of an unopened, previously-proposed aligned carbon nanotube bulk aggregate; ○ indicates the data of an opened one thereof; x indicates the data of mesoporous silica (SBA-15). The opened aligned carbon nanotube bulk structure of the present invention realized an extremely large specific surface area of about 1900 $m^2/g$. FIG. 5 shows the adsorption amount per unit volume; and FIG. 6 shows a relation between the adsorption amount per unit volume and the specific surface area per unit weight. From these drawings, it is known that the aligned carbon nanotube bulk structure of the present invention has a large specific surface area and good adsorption capability.

For the opening treatment, employable is a dry process of treatment with oxygen, carbon dioxide or water vapor. In case where a wet process is employable for it, it may comprise treatment with an acid, concretely refluxing treatment with hydrogen peroxide or cutting treatment with high-temperature hydrochloric acid.

The aligned carbon nanotube bulk aggregate having such a large specific surface area exhibits great advantages in various applications of electrode materials, batteries, capacitors, supercapacitors, electron emission devices, field emission type displays, adsorbents, gas storages, etc. When the specific surface area is too small and when the aggregate having such a small specific surface area is used in the above-mentioned applications, then the devices could not have desired properties. The uppermost limit of the specific surface area is preferably as high as possible, but is theoretically limited.

For the reason that the aligned carbon nanotube bulk structure of the invention has an extremely large specific surface area, it is considered that the structure has the following conditions.

1. The aligned carbon nanotube bulk structure comprises single-walled CNTs.

An aligned CNT structure comprising multi-walled CNTs has an extremely decreased specific surface area since nitrogen atoms cannot diffuse between carbon layers of CNTs. For example, the specific surface area of a double-walled aligned CNT structure is about one-half of that of the single-walled aligned CNT structure. For obtaining a specific surface area exceeding 1000 $m^2/g$, it is necessary that the content of the single-layered CNT in the aligned CNT structure is 50% or more.

2. CNTs constituting the aligned CNT structure have a high purity.

In order to obtain a large specific surface area, it is desirable that the purity of CNT is as high as possible. The purity referred to herein includes a carbon purity and an absolute purity. The carbon purity shows the weight percentage of carbon constituting the aligned carbon nanotube bulk structure. The absolute purity shows the weight percentage of CNTs constituting the aligned carbon nanotube bulk structure. An aligned carbon nanotube bulk structure with more deposition of carbon impurity has lower absolute purity though the carbon purity is high.

While there is no uppermost limit for the carbon purity in order to obtain a large specific surface area, it is difficult to obtain an aligned CNT structure at 99.9999% or higher with a view point of production. In a case where the carbon purity is less than 95%, it is difficult to obtain a specific surface area exceeding 1000 $m^2/g$ in a case of unopened CNTs.

Since the specific surface area of the carbon impurity is extremely small, it is necessary that the absolute purity is high in order to obtain a large specific surface area. In a case where the absolute purity is lower than 90%, it is difficult to obtain a specific surface area exceeding 1000 $m^2/g$ in a case of unopened CNTs.

3. The average outer diameter of the single-walled CNTs constituting the aligned carbon nanotube bulk structure is large, and the half-width value representing the range of the outer diameter distribution is large.

The single-walled CNTs constituting the aligned carbon nanotube bulk structure of the invention comprise single-walled CNTs having a large average outer diameter (2 nm or more) and a wide range for the distribution of outer diameter (half-width value: 1 nm or more), as well as with low linearity (G/D ratio; 50 or less). Accordingly, a spacing capable of diffusing nitrogen atoms is generated between the single-walled CNTs to obtain a large specific surface area. That is, large average outer diameter and wide range for the outer diameter distribution of the single-walled CNTs are suitable for obtaining a number of spacings capable of diffusing nitrogen atoms, that is, a large specific surface are.

The range for the average outer diameter and that for the half-width value of CNTs suitable for obtaining an aligned carbon nanotube bulk structure of a large specific surface area are 1.5 nm or more and 4 nm or less for the average outer diameter and 1 nm or more for the half-width value.

In a case where the average diameter exceeds 4 nm, since the mixed amount of the multi-layered CNT increases, the specific surface area decreases. Further, in a case where the average outer diameter exceeds 4 nm, since the CNT tends to be deformed to a flattened shape, the specific surface area is decreased in a case of opening. In a case where the average outer diameter is less than 1.5 nm, since a number of CNTs tend to adhere with no spacing to each other and form a large bundle, the specific surface area is decreased. Further, in a case where the half-width value is less than 1 nm, that is, the outer diameter of CNTs constituting the aligned CNT structure is uniform, since a number of CNTs adhere with no spacing to each other tending to form a large bundle also in this case, this causes the specific surface area to be decreased. While there is no particular uppermost limit for the half-width value, the half-width value is not larger than twice that of the average outer diameter.

On the contrary, an existent single-walled CNT structure having a small average outer diameter (smaller than 1.5 nm) and a narrow range for the outer diameter distribution (half-width value: less than 0.5 nm), as well as having high linearity (G/D ratio: 50 or more) usually tends to form a bundle in which hundreds to thousands single-walled CNTs are close packed. In this case; nitrogen atoms cannot diffuse through the spacing between CNTs in the bundle to decrease the specific surface area. According to the description, for example, in the Journal of Carbon, Vol. 41 (2003), pp. 1273 to 1280, HiPco single-walled CNTs manufactured by Carbon Nanotechnologies Corp. have an average outer diameter of about 0.75 nm and a half-width value of less than 0.5 nm and also have a high linearity. According to the description in the Journal of Nano Letters, Vol. 2 (2002), pp. 385 to 388, the specific surface area of such HiPco single-walled CNTs is 861 m$^2$/g even after applying an opening treatment, which is extremely smaller compared with the specific surface area of the aligned carbon nanotube bulk structure of the invention.

4. Linearity (crystallinity) of CNT is low.

The linearity (crystallinity) of CNT can be evaluated by a G/D ratio of Raman spectrum to be detailed later, and a preferred range for the linearity (crystallinity) of CNT for obtaining an aligned CNT structure having a large specific surface area is 1 or more and 50 or less in term of the G/D ratio. The G/D ratio is a ratio between the intensity of a G band peak attributable to the graphite crystal structure observed near 1590 kayser and the intensity of a D band peak attributable to the defect structure, etc. observed near 1340 kayser in the Raman spectrum of the aligned carbon nanotube bulk structure, CNT having a high G/D ratio shows high crystallinity and linearity.

It is considered that those having the G/D ratio of less than 1 have low crystallinity for the single-walled CNT, suffers from much contamination of amorphous carbon or the like, and have much content of CNT. On the contrary, in those having the G/D ratio exceeding 50, the linearity is high, single-walled CNTs tend to form a large bundle with less spacing and the specific surface area may possibly be decreased.

According to the descriptions in the Journal of J. Phys. Chem. B, vol. 110 (2006), pp. 5849 to 5853, the G/D ratio of a high quality CNT having high linearity and not containing defect structures is generally 100 or more, and, sometimes, 200 or more. The specific surface area of such CNT is 1000 m$^2$/g or less.

While it is preferred for the aligned carbon nanotube bulk structure of the invention to satisfy all of the four conditions described above, it is not always necessary to satisfy all of such conditions together and it may suffice that necessary conditions are satisfied appropriately with no excess or deficiency.

The aligned carbon nanotube bulk structure of the present invention may be in the form of a mesoporous material having a packing ratio of from 5 to 50%, more preferably from 10 to 40%, even more preferably from 10 to 30%. In this case, the material preferably contains those having a mesopore diameter of from 1.0 to 5.0 nm. The mesopores in this case are defined by the size thereof in the aligned carbon nanotube bulk structure. When the carbon nanotubes in the aligned carbon nanotube bulk structure are opened through oxidation treatment or the like as in Example 6, and when liquid nitrogen adsorption/desorption isothermal curves of the structure are prepared and SF plots are obtained from the adsorption curves, then the mesopores corresponding to the size of the carbon nanotubes may be computed. On the contrary, from the above-mentioned experimental facts, it is known that the opened aligned carbon nanotube bulk structure can function as a mesopore material. The packing ratio in the mesopores may be defined by the coating ratio of the carbon nanotubes. When the packing ratio or the mesopore size distribution falls within the above range, then the aligned carbon nanotube bulk structure is favorably used in applications of a mesoporous material and may have a desired strength.

An ordinary mesoporous material is an insulator, but the aligned carbon nanotube bulk structure of the present invention has high electric conductivity and, when formed into a sheet, it is flexible.

The Vickers hardness of the aligned carbon nanotube bulk structure of the present invention is preferably from 5 to 100 HV. The Vickers hardness falling within the range is a sufficient mechanical strength comparable to that of typical mesoporous materials, active carbon and SBA-15, and exhibits great advantages in various applications that require mechanical strength.

The aligned carbon nanotube bulk structure of the present invention may be provided on a substrate, or may not be thereon. In case where it is provided on a substrate, it may be aligned vertically to the surface of the substrate, or horizontally or obliquely thereto.

Further, the aligned carbon nanotube bulk structure of the present invention preferably shows anisotropy between the alignment direction and the direction vertical thereto, in at least any of optical properties, electric properties, mechanical properties and thermal properties. The degree of anisotropy of the aligned carbon nanotube bulk structure between the alignment direction and the direction vertical thereto is preferably at most 1/3, more preferably at most 1/5, even more preferably at most 1/10. The lowermost limit may be about 1/100. Also preferably, the intensity ratio of any of the (100), (110) and (002) peaks in the alignment direction and in the direction vertical thereto in X-ray diffraction is from 1/2 to 1/100 in terms of the ratio of the small value to the large value. FIG. 2 shows one example of the case. Such a large anisotropy of, for example, optical properties makes it possible to apply the structure to polarizers that utilize the polarization dependency of light absorbance or light transmittance. The anisotropy of other properties also makes it possible to apply the structure to various articles that utilize the individual anisotropy.

The quality of the carbon nanotubes (filaments) in the aligned carbon nanotube bulk structure can be evaluated through Raman spectrometry. One example of Raman spectrometry is shown in FIG. 7. In FIG. 7, (a) shows the anisotropy of Raman G band; and (b) and (c) show data of Raman G band. From the drawings, it is known that the G band having a sharp peak is seen at 1592 kayser indicating the presence of a graphite crystal structure. In addition, it is also known that the D band is small therefore indicating the presence of a high-quality graphite layer with few defects. On the short wavelength side, seen are RBM modes caused by plural single-walled carbon nanotubes, and it is known that the graphite layer comprises a single-walled carbon nanotubes. These confirm the existence of high-quality single-walled carbon nanotubes in the aligned carbon nanotube bulk structure of the present invention. Further, it is known that the Raman G band anisotropy differs by 6.8 times between the alignment direction and the direction vertical thereto.

Further, the aligned carbon nanotube bulk structure of the present invention may be patterned in a predetermined shape.

The shape includes, for example, thin films, as well as any desired blocks such as columns having a circular, oval or n-angled cross section (n is an integer of at least 3), or cubic or rectangular solids, and needle-like solids (including sharp, thin and long cones). The patterning method is described hereinunder.

Next described is a process for producing the aligned carbon nanotube bulk structure of the present invention.

The process for producing the aligned carbon nanotube bulk structure of the present invention is a process of chemical vapor deposition (CVD) of carbon nanotubes in the presence of a metal catalyst, which is characterized in that plural carbon nanotubes are grown, as aligned, in a reaction atmosphere, and then the resulting plural carbon nanotubes are exposed to liquid and dried thereby giving an aligned carbon nanotube bulk structure having a density of from 0.1 to 1.5 $g/m^3$.

First described is the method of aligned growth of plural aligned carbon nanotubes through CVD.

Aligned carbon nanotube aggregate as-grown without subjecting a density-increasing treatment is prepared.

The aligned carbon nanotube bulk aggregate as-grown referred to in the present specification means an aggregate of a plurality of CNTs grown from a substrate used for growing and it also includes those obtained by peeling the aggregate from the substrate. The aligned carbon nanotube bulk aggregate may be in any shape and form so long as they can be arranged on the substrate and can be suitably applied with the density-increasing step and may be, for example, in a thin plate shape, sheet, foil, or ribbon.

It may suffice that the density of the aligned carbon nanotube bulk aggregate in a grown state is such an extent that the density-increasing treatment to be described later can be conducted suitably. Specifically, it is preferred that the weight density is within a range from $0.002$ $g/cm^3$ to $0.2$ $g/cm^3$ or less since the aligned carbon nanotube bulk aggregate in the grown state is not disintegrated when the aggregate is detached from the substrate, and it has such a low density that the density-increasing treatment to be described later can be conducted.

The aligned carbon nanotube bulk aggregate as-grown can be produced by a known chemical vapor phase synthesis method. In this process, a catalyst is prepared on a substrate, and a plurality of CNTs are grown to the catalyst through chemical vapor phase deposition (CVD). The aligned carbon nanotube bulk aggregate as-grown may be produced by growing a plurality of CNTs aligned in a predetermined direction from a catalyst patterned on the substrate by using, for example, a method described in Japanese Patent Applications Nos. 2009-001586 and 2006-527894. While the properties of the aligned carbon nanotube bulk aggregate in the grown state produced by the method described in Japanese Patent Applications Nos. 2009-001586 and 2006-527894 depend on the details of production conditions, typical values thereof include a single-walled CNT content of 99% (ratio for the number of single-walled CNTs relative to double-walled CNTs and multi-walled CNTs, which is obtained by observing the synthesized aligned single-walled CNT aggregate by a transmission type electron microscope and determined based on the image), a density of $0.03$ $g/cm^3$, a G/D ratio of 2.5 to 40, a BET-specific surface area of $1150$ $m^2/g$, an average outer diameter of 2.5 nm, a half-width value of 2 nm, a carbon purity of 99.9%, an absolute purity of 98%, and a Herman's orientation factor of from 0.3 to 0.7.

As the carbon compound for the feedstock carbon source in CVD, usable are hydrocarbons like before, and preferred are lower hydrocarbons such as methane, ethane, propane, ethylene, propylene, acetylene. One or more of these may be used, and use of lower alcohols such as methanol or ethanol and low-carbon oxygen-containing compounds such as acetone or carbon monoxide may also be taken into consideration within an acceptable range for the reaction condition.

The atmospheric gas for reaction may be any one that does not react with carbon nanotubes and is inert at the growth temperature. Its examples include helium, argon, hydrogen, nitrogen, neon, krypton, carbon dioxide, chloride, and their mixed gases; and especially preferred are helium, argon, hydrogen and their mixed gases.

The atmospheric pressure in reaction may be any one falling within a pressure range within which carbon nanotubes can be produced, and is preferably from $10^2$ Pa to $10^7$ Pa (100 atmospheres), more preferably from $10^4$ Pa to $3\times10^5$ Pa (3 atmospheres), even more preferably from $5\times10^4$ Pa to $9\times10^4$ Pa.

As so mentioned in the above, a metal catalyst is made to exist in the reaction system, and the catalyst may be any suitable one heretofore used in production of carbon nanotubes. For example, it includes thin film of iron chloride, thin film of iron formed by sputtering, thin film of iron-molybdenum, thin film of alumina-iron, thin film of alumina-cobalt, thin film of alumna-iron-molybdenum, etc.

The amount of the catalyst may fall within any range heretofore employed in production of carbon nanotubes. For example, when an iron metal catalyst is used, then its thickness is preferably from 0.1 nm to 100 nm, more preferably from 0.5 nm to 5 nm, even more preferably from 1 nm to 2 nm.

Regarding the catalyst positioning, employable is any method of positioning the metal catalyst having a thickness as above, suitable for sputtering deposition.

The temperature in the growth reaction in CVD may be suitably determined in consideration of the reaction pressure, the metal catalyst, the carbon source material, etc.

According to the process of the present invention, a catalyst may be disposed on a substrate, and plural carbon nanotubes may be grown, as aligned vertically to the substrate surface. In this case, any substrate heretofore used in production of carbon nanotubes is employable, for example, including the following:

(1) Metals and semiconductors such as iron, nickel, chromium, molybdenum, tungsten, titanium, aluminium, manganese, cobalt, copper, silver, gold, platinum, niobium, tantalum, lead, zinc, gallium, germanium, indium, arsenic, indium, phosphorus, antimony; their alloys; and oxides of those metals and alloys.

(2) Thin films, sheets, plates, powders and porous materials of the above-mentioned metals, alloys and oxides.

(3) Non-metals and ceramics such as silicon, quartz, glass, mica, graphite, diamond; their wafers and thin films.

For the method of patterning the catalyst, employable is any suitable method capable of directly or indirectly patterning the catalyst metal. It may be a wet process or a dry process; and for example, herein employable are patterning with mask, patterning by nano-imprinting, patterning through soft lithography, patterning by printing, patterning by plating, patterning by screen printing, patterning through lithography, as well as a method of patterning some other material capable of selectively adsorbing a catalyst on a substrate and then making the other material selectively adsorb a catalyst thereby forming a pattern. Preferred methods are patterning through lithography, metal deposition photolithography with mask, electron beam lithography, catalyst metal patterning through electron beam deposition with mask, and catalyst metal patterning through sputtering with mask.

According to the process of the present invention, an oxidizing agent such as water vapor may be added to the reaction atmosphere described in Non-Patent Document 1 thereby growing a large quantity of aligned single-walled carbon nanotubes. Needless-to-say, the invention should not be limited to the process, in which, therefore, any other various processes may be employed.

In the manner as above, an aligned carbon nanotube bulk aggregate before exposed to liquid and dried may be obtained.

The method of peeling the aligned carbon nanotube bulk aggregate from the substrate may be a method of peeling it from the substrate physically, chemically or mechanically. For example, herein employable are a method of peeling it by the action of an electric field, a magnetic field, a centrifugal force or a surface tension; a method of mechanically peeling it directly from the substrate; and a method of peeling it from the substrate under pressure or heat. One simple peeling method comprises picking it up directly from the substrate with tweezers and peeling it. More preferably, it may be cut off from the substrate by the use of a thin cutting tool such as cutter blade. Further, it may be peeled by suction from the substrate, using a vacuum pump or a vacuum cleaner. After peeled, the catalyst may remain on the substrate, and it may be again used in the next step of growing carbon nanotubes. Needless-to-say, the aligned carbon nanotube bulk aggregate formed on the substrate may be directly processed as it is in the next step.

According to the process of the present invention, plural aligned carbon nanotubes formed in the manner as above are exposed to liquid and then dried thereby giving the intended aligned carbon nanotube bulk structure.

The density-increasing treatment, is a method of dipping an aligned carbon nanotube bulk aggregate into a liquid having an affinity with CNT, inducing aggregation between CNTs to each other by evaporation of the liquid which impregnates between CNTs and surface tension of the liquid caused thereby and improving the number density of CNTs. Density increase proceeds when the aligned carbon nanotube aggregate impregnated or deposited with the liquid is dried by the density-increasing treatment for the CNT aggregate. It is considered that the phenomenon occurs due to adhesion of neighboring CNTs to each other by the surface tension upon evaporation of the liquid deposited to individual CNTs.

The liquid to which plural aligned carbon nanotubes are exposed is preferably one that has an affinity to carbon nanotubes and does not remain in the carbon nanotubes wetted with it and then dried. The liquid of the type usable herein includes, for example, water, alcohols (isopropanol, ethanol, methanol), acetones (acetone), hexane, toluene, cyclohexane, DMF (dimethylformamide), etc.

For exposing plural aligned carbon nanotubes to the above-mentioned liquid, for example, employable are a method comprising dropwise applying the liquid droplets little by little onto the upper surface of the aligned carbon nanotube aggregate and repeating the operation until the aligned carbon nanotube aggregate is finally completely enveloped by the liquid droplets; a method comprising wetting the surface of the substrate with the liquid by the use of pipette, then infiltrating the liquid into the aligned carbon nanotube aggregate from the point at which the aggregate is kept in contact with the substrate, thereby wetting entirely the aligned carbon nanotube aggregate; a method comprising vaporizing the liquid and exposed the entire aligned carbon nanotube aggregate with the vapor in a predetermined direction; a method comprising spraying the liquid onto the aligned carbon nanotube aggregate so as to wet it with the liquid. For drying the aligned carbon nanotube aggregate after wetted with the liquid, for example, employable is a method of spontaneous drying at room temperature, vacuum drying, or heating on a hot plate or the like.

When plural aligned carbon nanotubes are exposed to the liquid, their aggregate may shrink a little and may much shrink when dried, thereby giving an aligned carbon nanotube bulk aggregate having a high density. In this case, the shrinkage is anisotropic, and one example is shown in FIG. 8. In FIG. 8, the left side shows an aligned carbon nanotube bulk aggregate produced according to the process of Non-Patent Document 1; and the right side shows one produced by exposing the aligned carbon nanotube bulk aggregate to water followed by drying. The alignment direction is z direction; and the plane vertical to the alignment direction has x direction and y direction defined therein. The shrinking image is shown in FIG. 9.

Even when an aligned carbon nanotube bulk aggregate merely grown on a substrate is exposed to a liquid and then dried, the density is increased in a not uniform island form as shown in FIGS. 21(*b*), (*c*), (*d*) (refer to Nirupama Chakrapani, et al. Capillarity-driven assembly of two dimensional cellular carbon nanotube foams, Proceedings of the National Academy of Sciences, 2004.3.23, vol. 101, pp. 4009 to 4012). Further, direction of alignment is not uniform due to uneven increase of density. Accordingly, this caused a problem that an aligned carbon nanotube bulk structure increased in the density and having desired form and shape cannot be formed.

[Problem in the Density-Increasing Step—Substrate]

In order to solve the problem, an aligned carbon nanotube bulk aggregate is not exposed to a liquid on a substrate used for growth but it is once peeled from the substrate, then exposed to the liquid, and dried. In a case where the aligned carbon nanotube bulk aggregate is present on the substrate used for growth, each of the CNTs is closely adhered to the substrate, and fixed at one end face to the substrate. Therefore, even when the density-increasing treatment is applied, CNT moves freely, the density cannot be increased, and the density is increased in the not uniform island form described previously. When the aligned carbon nanotube bulk aggregate is peeled from the substrate, since all CNTs can move freely, this is suitable for obtaining an aligned carbon nanotube bulk structure increased in the density and having desired form and shape.

An aligned CNT aggregate having a height (length of CNT) from several tens μm to hundred μm obtained by the existent CNT production process tended to be disintegrated when peeled from the substrate to result in a problem that peeling in an integrated shape was extremely difficult.

In order to solve the problem, an aligned carbon nanotube bulk aggregate with a height of 1 mm or more which was remarkably large scaled compared with the existent method by adding an extremely small amount of steams in the reaction atmosphere described in the Non-patent Document 1 was used. Further, in a case where the aligned carbon nanotube bulk aggregate contains much carbon impurity, adhesion with the substrate increases and the aggregate cannot be peeled as an integrated piece. In order to solve the problem, the growth of the aligned carbon nanotube bulk aggregate was computed by the method of the patent document (Japanese Patent Application No. 2008-051321) and the growth was interrupted when the growth rate was lowered. With such a procedure, deposition amount of the carbon impurity to the aligned carbon nanotube bulk aggregate can be minimized. Accordingly, an aligned carbon nanotube bulk aggregate as grown having low adhesion with the substrate and easily peelable as an integrated piece from the substrate could be obtained. The content of the carbon impurity can be estimated by the method described in the non-patent document, the Journal of Nano Letters, vol. 9, pp 769 to 773. It is preferred that the absolute purity of the aligned carbon nanotube bulk aggregate (weight of CNT in the entire weight) is 90% or more for lowering the adhesion with the substrate.

[Problem in the Density-Increasing Step—Solution]

The aligned carbon nanotube bulk aggregate peeled from the substrate as described above was exposed to the solution by being dipped entirely into a solution filled in a beaker. In this case, when a solution such as water with less affinity to CNT was used, this imposed a problem that the solution does not impregnate thoroughly to the aligned carbon nanotube bulk aggregate entirely, so that the density was increased in a not uniform shape. On the contrary, in a case of using a solution such as an alcohol having a high affinity to CNT, this imposed a problem of increasing the density abruptly to thereby increase the density in a not uniform shape.

In view of above, in order to solve the problem, a mixed solution comprising a solution having a high affinity to CNT and a solution having a low affinity to CNT was used. For example, a mixed solution comprising water and an alcohol can be exemplified. When such a solution is used, since the rate of increasing the density can be controlled and the solution can be impregnated uniformly and thoroughly to the aligned carbon nanotube bulk aggregate entirely, an aligned carbon nanotube bulk structure which was increased more in the density could be obtained.

In a case of dipping the aligned carbon nanotube bulk aggregate peeled from the substrate into such a mixed solution, there was a problem that the density was increased at first from a place where the aligned carbon nanotube bulk aggregate was in contact with the solution and, accordingly, the density of the aggregate was increased in a not uniform form.

Then, in order to solve such a problem, the aligned carbon nanotube bulk aggregate was once immersed entirely into a beaker filled with water, and then an alcohol was supplied through a pipette or, the like from below the aligned carbon nanotube bulk aggregate, thereby forming a mixed solution. With such a procedure, not uniform density increase during dipping of the aligned carbon nanotube bulk aggregate into the solution can be minimized and a high density aligned carbon nanotube bulk structure can be obtained.

The degree of alignment of the thus obtained aligned carbon nanotube bulk structure is not deteriorated by the density increase when compared with the aligned carbon nanotube bulk structure.

[Subject in the Density-Increasing Step—Desired Form/Shape]

By using the method described above, an aligned carbon nanotube bulk structure increased in the density can be obtained. However, since the direction and the extent of the density increase are not controlled, it is extremely difficult to obtain an aligned carbon nanotube bulk structure having a desired shape.

Then, the following means is provided in order to solve the problem.

A) The direction of increasing the density is controlled thereby controlling the shape by forming the aligned carbon nanotube bulk aggregate into a thin film shape and utilizing interaction with the substrate.

B) The shape of the aligned carbon nanotube bulk structure is controlled by applying a weak external pressure during exposure of the aligned carbon nanotube bulk aggregate into the solution.

By using such a method, an aligned carbon nanotube bulk structure having a desire shape can be obtained.

[Thin Film Shaped High Density Aligned Carbon Nanotube Bulk Structure]

For obtaining an aligned carbon nanotube bulk structure having a desired shape, when an aligned carbon nanotube bulk aggregate is grown into a thin film shape, a synthesized aligned carbon nanotube bulk aggregate is peeled from the substrate and arranged on another substrate with the alignment direction in parallel to the surface of the substrate, and a density-increasing treatment is applied, the direction of shrinkage of the aligned carbon nanotube bulk structure is restricted one-dimensionally in a direction vertical to the substrate. This is attributable to that not only the movement of individual CNTs along the surface of the substrate is restricted by the adhesion force between the aligned carbon nanotube bulk aggregate and the substrate but also evaporation of the liquid from the lateral portion of the aligned carbon nanotube bulk aggregate generates a surface tension exclusively in the direction of the height. Then, since the density of the aligned carbon nanotube bulk aggregate is increased uniformly only in the direction of the thickness, an aligned carbon nanotube bulk structure having a desired shape can be obtained with no problem for the occurrence of shrinkage in the island shape upon applying the density-increasing treatment to the bulk CNT aggregate grown vertically from the substrate used for synthesis.

The density-increasing treatment involved a problem that creasing was formed sometimes during density increase when bubbles are formed in the thin-film shape aligned carbon nanotube bulk aggregate dipped in the solution, tweezers for handling the carbon nanotube, or the membrane handling the carbon nanotube film. Further, there was a problem that alignment of the thin film shape aligned carbon nanotube bulk aggregate to a desired direction during the density increase was difficult. Further, there was a problem that a solvent sometimes remained in the aligned carbon nanotube bulk structure increased in the density during drying in the density increase. Further, upon arrangement and density increase of the aligned carbon nanotube bulk aggregate, there was a problem that not only the aggregate shrunk in the direction normal to the substrate due to the surface tension of the liquid on the surface of the substrate but also a portion of the aligned carbon nanotube bulk aggregate sometimes warped on the surface of the substrate and was increased in the density.

In the invention, in order to solve the problems, the intensity of illumination from a microscope used for observation was changed from a maximum illuminance to a minimum illuminance just before drying. It is considered that the drying state of the aligned carbon nanotube bulk aggregate is controlled thereby enabling to suppress the warping by adjusting the illuminance of a solid microscope.

Further, bubbling can be inhibited by dipping the aligned carbon nanotube bulk aggregate, tweezers for handling the aligned carbon nanotube bulk aggregate, or a membrane for handling the aligned carbon nanotube bulk aggregate sufficiently in a solution placed on a substrate used for increasing the density and observing the same by the solid microscope. Further, the aligned carbon nanotube bulk aggregate can be arranged at a desired position and in a desired alignment by gripping a membrane filter at the top end of tweezers, dipping the same in the solution on the substrate in the same manner as the aligned carbon nanotube bulk aggregate, and manipulating the tweezers, that is, the membrane filter while observing the direction of alignment of the aligned carbon nanotube bulk aggregate by a microscope, thereby moving the aligned carbon nanotube bulk aggregate in the solution.

Further, density can be increased by transferring the aligned carbon nanotube bulk aggregate held by tweezers to the needle top end of an manipulator having a needle, arranging the same together with the manipulator having the needle in the same manner while controlling the manipulator at a desired position and in a desired alignment, pressing the same by the manipulator, and then dripping a solution used for the density increase. The top end capable of position control may be a needle-like or bar-like top end made of a rigid material such as tungsten or may be a flexible top end made of a resin, etc. Further, a jig capable of pinching such as tweezers may also be utilized as the top end.

In this case, for more effectively preventing the warping, methanol is used particularly preferably as a solution used for increasing the density.

[Density-Increasing Treatment—Drying]

Density-increasing treatment is conducted typically by drying the aligned carbon nanotube bulk aggregate with adhesion of the liquid. The method of drying the aligned carbon nanotube bulk aggregate usable herein can include, for example, spontaneous drying in air at a room temperature, spontaneous drying in a nitrogen atmosphere at a room temperature, drying in vacuum, spontaneous drying in the presence of an inert gas such as argon, and drying and heating in the atmosphere described above.

When the aligned carbon nanotube bulk aggregate is dipped in the liquid, CNTs are adhered to each other in which the entire volume shrinks a little and, the adhesion increases more upon evaporation of the liquid, to cause much shrinkage of the volume and, as a result, a CNT film structure of increased density is formed. In this case, the density-increasing step is controlled such that the CNT film structure shrinks exclusively in the direction of the thickness with scarce area shrinkage for the plane parallel to the substrate due to the contact resistance thereof with the substrate.

The density-increasing treatment is conducted for the aligned carbon nanotube bulk aggregate by exposing the aligned carbon nanotube bulk aggregate to the liquid on the substrate used for arrangement and drying the aligned carbon nanotube bulk aggregate with adhesion of the liquid. In the density-increasing treatment, the aligned carbon nanotube bulk aggregate is arranged while making the direction of arrangement uniform at an optional position from the periphery of the aligned carbon nanotube bulk aggregate exposed to the solution. In a case where the solution is dried from the periphery of the aligned carbon nanotube bulk aggregate, a portion of the aligned carbon nanotube bulk aggregate may sometimes be densified and adhered to the substrate. In this case, it is difficult for arranging the aligned carbon nanotube bulk aggregate at an optional position or making the direction of alignment uniform.

When the solution evaporates spontaneously in air at a room temperature and the aligned carbon nanotube bulk aggregate can move no more, the surface of the aligned carbon nanotube bulk aggregate is observed, the solution is dried spontaneously till the surface of CNT becomes visible, thereby increasing the density of the aligned carbon nanotube aggregate. As the solution, isopropyl alcohol that facilitates impregnation between CNTs in the aligned carbon nanotube bulk structure and also facilitates evaporation for increasing the density is used. Further, upon increasing the density of the aligned carbon nanotube bulk aggregate, a portion of the aligned carbon nanotube aggregate sometimes warped on the surface of the substrate to increase the density. In this case, warping at the surface of the substrate is suppressed by controlling the drying and the evaporation of the solution by replacing the solution with other solution such as methanol, or by illuminating the aligned carbon nanotube bulk aggregate during drying and weakening illumination when the surface of the CNT is visible during drying of the aligned carbon nanotube bulk aggregate. Isopropyl alcohol or methanol that facilitates impregnation between CNTs in the aligned carbon nanotube bulk aggregate and also facilitates evaporation for density increase is used as the solution.

As described above, arrangement and density increase of the aligned carbon nanotube bulk aggregate may be conducted simultaneously. Alternatively, a solution may be dropped subsequent to previous arrangement of the aligned carbon nanotube bulk aggregate and only the density increase may be conducted along with impregnation and evaporation of the solution into and from the aligned carbon nanotube bulk aggregate.

Another method of obtaining an aligned carbon nanotube bulk structure having a desired shape includes, for example, a method of applying a weak external pressure during exposure of the aligned carbon nanotube bulk aggregate to the solution thereby controlling the shape of the aligned carbon nanotube bulk structure.

Further, during exposure to solution, when weak external pressure is applied thereto, then the shape of the aligned carbon nanotube bulk structure may be controlled. For example, when the bulk structure is dipped in solution and dried while weak pressure is applied thereto in the x direction vertical to the alignment direction, then an aligned carbon nanotube bulk structure shrunk mainly in the x direction may be obtained. Similarly, when the solution dipping and drying is effected while weak pressure is applied obliquely to the alignment direction z, then a thin-filmy aligned carbon nanotube bulk structure shrunk mainly in the z direction may be obtained.

The aligned carbon nanotube bulk aggregate may be processed according to the above process, after it is removed from the substrate on which it has grown, then it is placed on another substrate. In this case, it is possible to produce an aligned carbon nanotube bulk aggregate having high adhesiveness to any desired substrate. For example, in case where a thin-filmy aligned carbon nanotube bulk aggregate is formed on a metal, then it may have high electric conductivity adjacent to a metal electrode as in Example 10, and for example, it may be favorably utilized in an application of electroconductive materials for heater or capacitor electrodes. In this case, the pressure may be weak in such a level of picking up with tweezers, and it does not cause damage to the carbon nanotubes. Pressure alone could not compress the bulk aggregate to have the same degree of shrinkage not causing damage to the carbon nanotubes, and it is extremely important to use solution for producing a favorable aligned carbon nanotube bulk aggregate.

While the density-increasing treatment adopts the method of exposing the aligned carbon nanotube bulk aggregate to the liquid and then drying the same, it is assumed that the mechanism in which the aligned carbon nanotube bulk aggregate shrinks in the density-increasing treatment is attributable to that CNTs are attracted to each other by the surface tension of the liquid impregnating between each of the CNTs as described above and the bound state between CNTs to each other is maintained even after the evaporation of the liquid. Accordingly, any method of forming the surface tension between CNTs to each other may be used for the density-increasing treatment and, for example, a method of using high temperature steams can be applied.

Raman data of the aligned carbon nanotube bulk structure produced by exposing plural aligned carbon nanotubes to water followed by drying are shown in FIG. 10 as one example. This drawing shows no water remaining in the dried bulk structure.

According to the process of the present invention, the shape of the aligned carbon nanotube bulk structure may be controlled in any desired manner depending on the patterning of the metal catalyst and on the growth of the carbon nanotubes. One example of a model of shape control is shown in FIG. 11.

This is an example of a thin-filmy aligned carbon nanotube bulk aggregate (relative to the diameter size of the carbon nanotubes, the aggregate (before exposed to liquid) is thin filmy but may be said bulky); and the thickness is thin relative to the height and the width, the width may be controlled in any desired length by patterning of the catalyst, the thickness may also be controlled in any desired thickness by patterning of the catalyst, and the height may be controlled by the growth of the plural aligned carbon nanotubes that constitute the aggregate (before exposed to liquid). When the aligned carbon nanotube aggregate before exposure to liquid is patterned in a predetermined shape and when it is exposed to liquid and dried, then a high-density aligned carbon nanotube bulk structure shrunk to a predetermined shrinkage (this may be previously estimated) and patterned in a predetermined shape may be produced.

The aligned carbon nanotube bulk structure of the present invention has an extremely large density and a high hardness as compared with conventional aligned carbon nanotube bulk structures, and further, the aligned carbon nanotube bulk structure patterned in a predetermined shape has various properties and characteristics such as ultra high purity, ultra heat conductivity, high specific surface area, excellent electronic and electric properties, optical properties, ultra mechanical strength, ultra high density, etc.; and therefore, they can be applied to various technical fields as mentioned below.

(A) Heat Dissipation Material (Heat Dissipation Properties):

Articles that require heat radiation, for example, CPU serving as the core of computers of electronic articles are required to have rapider and more integrated computation capacity, and the degree of heat generation from CPU itself increasing more and more; and it is said that there may be a probability of limitation on the performance improvement of LSI in the near future. Heretofore, in heat dissipation at such a high heat generation density, known is a heat dissipation material produced by random-aligned carbon nanotubes embedded in polymer, which, however, is problematic in that its heat dissipation characteristics in the vertical direction are poor. Of the large-scaled aligned carbon nanotube bulk structure of the present invention, vertically-aligned ones have high heat dissipation properties and, in addition, they have high density and are long and aligned vertically; and accordingly, when they are utilized as heat dissipation materials, then they may drastically increase their heat dissipation properties in the vertical direction, as compared with conventional articles.

One example of the heat dissipation material is schematically shown in FIG. 12.

Not limited to electronic parts, the heat dissipation material of the present invention is applicable to other various articles that require heat dissipation, for example, electric products, optical products and machinery products.

(B) Heat Conductors (Heat Conduction Properties):

The aligned carbon nanotube bulk structure of the present invention has good heat conduction properties. The aligned carbon nanotube bulk structure having such excellent heat conductive properties may be worked into a heat conductor of a composite material containing it, thereby giving a high heat conduction material. For example, when it is applied to heat exchangers, driers, heat pipes, etc.; it may improve their performance. In case where the heat conductor is applied to heat exchangers for aerospace use, it may improve the heat exchange performance and may reduce the weight and the volume. In case where the heat conductor is applied to fuel cell cogenerations and micro-gas turbines, it may improve the heat exchange performance and the heat resistance. One example of a heat exchanger that utilizes the heat conductor is schematically shown in FIG. 13.

(C) Electric Conductors (Electric Conductive Properties):

The aligned carbon nanotube bulk structure of the present invention has excellent electric properties such as electric conductivity. FIG. 14 shows current/voltage characteristics under high current application. FIG. 15 shows current/voltage characteristics under low current application.

The electric conductor of the present invention, or its wiring structure is usable as electric conductors or wiring structures in various articles that require electric conductivity, such as electric products, electronic products, optical products and machinery products.

For example, the above-mentioned aligned carbon nanotube bulk structure of the present invention, or a patterned aligned carbon nanotube bulk structure produced by patterning it in a predetermined shape may be used in place of copper wiring thereby contributing to better micropatterning and stabilization of devices because of its superiority in the high electric conductivity and the mechanical strength.

(D) Supercapacitors, Secondary Batteries (Electric Properties):

A supercapacitor stores energy by charge movement therein, and is therefore characterized in that large current may run through it, it is durable to more than 100,000 charge-discharge cycles and its charging time is short. The important properties of supercapacitor are that its capacitance is large and its internal resistance is small. The capacitance is determined by the size of pores, and it is known that the capacitance could be the largest when the size of mesopores is from 3 to 5 nm or so, and this may be the same as the size of the carbon nanotubes that constitutes the aligned carbon nanotube bulk structure of the present invention. In the aligned carbon nanotube bulk structure of the present invention, or a patterned aligned carbon nanotube bulk structure produced by patterning it in a predetermined shape, all the constitutive elements may be optimized in parallel to each other and, in addition, since the surface area of the electrode and the like may be maximized, the internal resistance may be minimized, and therefore a high-performance supercapacitor can be produced.

One example of a supercapacitor in which an aligned carbon nanotube bulk structure of the present invention, or a patterned aligned carbon nanotube bulk structure produced by patterning it in a predetermined shape is used as the constitutive material or the electrode material is schematically shown in FIG. 16.

Not limited to supercapacitors, the aligned carbon nanotube bulk structure of the present invention is applicable to constitutive materials for ordinary capacitors and also to electrode materials for secondary batteries such as lithium batteries, and electrode (negative electrode) materials for fuel cells or air cells, etc.

(E) Gas Storage Material, Adsorbent (Absorbing Properties):

It is known that carbon nanotubes have a property of absorbing gas such as hydrogen or methane. Accordingly, the aligned carbon nanotube bulk structure of the present invention, having a large specific surface area, is expected to be applicable to storage and transportation of gas such as hydrogen or methane. FIG. 17 is a conceptual view schematically showing a case of application of the aligned carbon nanotube bulk structure of the present invention to a hydrogen storage. Like an active carbon filter, the bulk structure may absorb a harmful gas or substance, thereby to separate and purity a substance or gas.

(F) Flexible Electrically Conductive Heaters:

The aligned carbon nanotube bulk structure of the present invention may be patterned in a thin film, and the patterned thin film is flexible and generates heat when a current on a predetermined level or more is applied thereto. Therefore, this is utilizable as flexible electrically conductive heaters. FIG. 18 shows examples of the aligned carbon nanotube bulk structure of the present invention applied to flexile electrically conductive heaters.

EXAMPLES

Examples are shown below, and described in more detail. Needless-to-say, the present invention should not be limited to the following Examples.

Example 1

An aligned carbon nanotube aggregate was grown through CVD under the condition mentioned below.

Carbon compound: ethylene, feeding speed 100 sccm.

Atmosphere (gas) (Pa): helium/hydrogen mixed gas, feeding speed 1000 sccm, one atmospheric pressure Water vapor amount added (ppm): 150 ppm Reaction temperature (° C.): 750° C.

Reaction time (min): 10 min

Metal catalyst (existing amount): thin iron film, thickness 1 nm

Substrate: silicon wafer

A sputtering vapor deposition device was used for disposing the catalyst on the substrate; and an iron metal having a thickness of 1 nm was disposed through vapor deposition.

Water droplets were dripped little by little to the CNT obtained as described above till CNT was completely incorporated with the water droplets. Then, the water-containing CNT was dried being placed on a hot plate kept at about 170° C.

The properties of the obtained aligned carbon nanotube bulk structure are shown in Table 1, as compared with the properties of the aligned carbon nanotube bulk aggregate as-grown.

TABLE 1

|  | Aligned Bulk Aggregate as-grown | Aligned Bulk Structure of Example 1 |
| --- | --- | --- |
| Density (g/cm$^3$) | 0.029 | 0.57 |
| Nanotube Density (number of nanotubes/cm$^2$) | 4.3 × 10$^{11}$ | 8.3 × 10$^{12}$ |
| Area per one nanotube | 234 nm$^2$ | 11.9 nm$^2$ |
| Lattice Constant | 16.4 nm | 3.7 nm |
| Coating Ratio | about 3% | 53% |
| Vickers Hardness | about 0.1 | 7 to 10 |

The purity of the aligned carbon nanotube bulk aggregate of Example 1 was 99.98%.

Example 2

An aligned carbon nanotube bulk structure of Example 2 was produced in the same manner as in Example 1, for which, however, the aligned carbon nanotube bulk aggregate as-grown was exposed to ethanol but not to water. Like that of Example 1, the aligned carbon nanotube bulk structure also had high density and its other properties were also good.

Example 3

In Example 1, the aligned carbon nanotube bulk aggregate as-grown was exposed to any of alcohols (isopropanol, methanol), acetone (acetone), hexane, toluene, cyclohexane or DMF (dimethylformamide) in place of water, and then dried. Like that in Example 1, the obtained products all had high density and their other properties were also good.

Example 4

Aligned Carbon Nanotube Bulk Structure Having a Desired Shape

While the properties of the aligned carbon nanotube bulk structure in the grown state produced in this example depend on the details of production conditions, under the production conditions to be described later, typical values include a single-walled CNT content of 99% (ratio for the number of single-layered CNTs relative to 2-layered CNT and multi-layered CNT, which is obtained by observing the synthesized aligned single-walled CNT structure by a transmission type electron microscope and determined based on the image), a density of 0.55 g/cm$^3$, a G/D ratio of 2.5 to 40, a BET-specific surface area of 1000 m$^2$/g, an average outer diameter of 2.8 nm, a half-width value of 2 nm, a carbon purity of 99.9%, an absolute purity at 98%, and a Herman's orientation factor of 0.7.

An aligned carbon nanotube aggregate was grown through CVD under the condition mentioned below.

Carbon compound: ethylene, feeding speed 100 sccm

Atmosphere (gas) (Pa): helium/hydrogen mixed gas, feeding speed 1000 sccm, one atmospheric pressure Water vapor amount added (ppm): 150 ppm Reaction temperature (° C.): 750° C.

Reaction time (min): 10 min

Metal catalyst (existing amount): thin iron film, thickness 1 nm

Substrate: silicon wafer

A sputtering vapor deposition device was used for disposing the catalyst on the substrate; and an iron metal having a thickness of 1 nm was disposed through vapor deposition.

Further, in a case where the alignment carbon nanotube bulk aggregate contains much carbon impurity, adhesion with the substrate increases and the aggregate can no more be peeled as an integrated piece. In order to solve the problem, growing of the aligned carbon nanotube bulk structure was measured by the method of the patent document; Japanese Patent Application No. 2008-051321 and the growth was interrupted when the growing rate was lowered. With such a method, an aligned carbon nanotube bulk structure in a growth state having a shape of 1 mm height and 1 cm square was obtained.

For more detailed production conditions and production apparatus, the patent document (U.S. Ser. No. 12/318,443) or (U.S. Ser. No. 11/658,577) may be referred to.

While the properties of the aligned carbon nanotube bulk aggregate in the growth state produced by the method described above depend on the details of production conditions, typical values thereof include a single-walled CNT content of 99% (ratio for the number of single-walled CNTs relative to double-walled CNT and multi-walled CNT, which is obtained by observing the synthesized aligned single-walled CNT aggregate by a transmission type electron microscope and determined based on the image), a density of 0.03 $g/cm^3$, a G/D ratio of 2.5 to 40, a BET-specific surface area of 1150 $m^2/g$, an average outer diameter of 2.8 nm, a half-width value, of 2 nm, a carbon purity and 99.9%, an absolute purity at 98%, and a Herman's orientation factor of 0.7.

Description is to be made to a production process for an aligned carbon nanotube bulk structure having a desired shape and increased in the density by applying an external pressure.

1) The aligned carbon nanotube bulk aggregate in the growth state obtained by the method described above was peeled as an integrated piece from a substrate used for growth. Peeling was conducted by abutting a blade tip of a knife cutter to a base portion of the aligned carbon nanotube bulk aggregate, moving the blade tip moderately by a slight force and cutting out the aligned carbon nanotube bulk aggregate from the substrate so as not to cause disintegration and deform the shape.

2) Two sheets of rectangular flat glass slides of an identical size were prepared.

3) The aligned carbon nanotube bulk aggregate in the growth state was arranged at a central portion of one glass slide in a direction in which the CNT was aligned vertical to the glass slide. In this manner, an aligned carbon nanotube bulk aggregate of 1 cm square and 1 mm height was arranged on the glass slide.

4) A second glass slide was placed on the aligned carbon nanotube bulk aggregate in the growth state so as to cover the first glass slide. In this case, two glass slides were placed while being overlapped in the direction of the short axis and being displaced by 1 mm in the direction of the long axis.

5) By pushing and, simultaneously, displacing the second slide and applying a pressure in the direction vertical to the two substrates sandwiching the CNTs and in the horizontal direction along the longitudinal direction of the substrate, whereby a compressive stress and a shear stress were applied to the aligned carbon nanotube bulk aggregate.

Care is taken in this case such that the compressive stress and the share stress are applied simultaneously and under a force and a displacement of about identical extent. In a case where the compressive stress and the shear stress are different, the density of the aligned carbon nanotube bulk aggregate is not increased to generate disturbance in the arrangement or generation of cracks in CNTs. By the procedures described above, the CNTs are turned down, aligned in parallel to the glass slide, and increased somewhat in the density. The external force used in the process may be extremely small at such an extent as applied by gripping of a clip.

6) Two substrates sandwiching CNTs are fixed by a clip.

7) The substrates are placed in a water-containing vessel, subsequently, an alcohol is supplied by a pipette from below the substrates to form a mixed solution comprising water and an alcohol, and the substrates are dipped therein for about 20 min.

8) Foams are formed from the CNT in this step. When the generation of the foams is ceased, the substrates are taken out of the vessel and the substrates are placed on a warmed hot plate and dried for about 1 hour. Density increase is not uniform unless the substrate is dried after completely removing the foams.

9) After the drying, one glass slide is removed moderately. In a case where the glass slide cannot be removed easily, the process is returned to the step 6, the aligned carbon nanotube bulk aggregate is dipped again into the solvent, a slight share stress is applied to the glass slide to reduce adhesion between the glass slide and the aligned carbon nanotube bulk aggregate, and the step 8 is conducted. The procedures are repeated till the glass slide is removed easily. In a case where the glass slide is removed by forcively applying a force, the aligned carbon nanotube bulk structure is disintegrated.

As described above, a high density aligned carbon nanotube bulk structure at 1 cm×1 cm×70 μm height in which CNTs are aligned in the longitudinal direction and having a desired shape is obtained. An aligned carbon nanotube bulk structure of a desired shape can be obtained by adjusting the size of the aligned carbon nanotube bulk aggregate in the growth state to be used.

Example 5

Thin Film-Shape High Density Aligned Carbon Nanotube Bulk Structure

While properties of the aligned carbon nanotube bulk structure produced by this example depend on the details of production conditions, under the production conditions to be described later, typical values thereof include a single-walled CNT content of 99% (ratio for the number of single-walled CNTs relative to double-walled CNT and multi-walled CNT, which is obtained by observing the synthesized aligned single-walled CNT aggregate by a transmission type electron microscope and determined based on the image), a density of 0.55 $g/cm^3$, a G/D ratio of 2.5 to 40, a BET-specific surface area of 1000 $m^2/g$, an average outer diameter of 2.8 nm, a half-width value of 2 nm, a carbon purity of 99.9%, an absolute purity of 98%, and a Herman's orientation factor of 0.7.

A catalyst was patterned by the method described in the patent document (U.S. Ser. No. 12/31844) or the patent document (U.S. Ser. No. 11/658,577) and a thin film-shape aligned carbon nanotube bulk aggregate in the growth state (hereinafter referred to as CNT film) of a size having 10 μm thickness, 1 mm height, and 1 cm width was obtained by the method of Example 4.

Then, the CNT film synthesized on the substrate used for growth was detached from the substrate used for growth and the CNT film was arranged and adhered to another substrate.

Upon detachment, it was difficult to take out CNT from a group of adhered CNT films. Further, it was difficult to divide the taken out CN films on every one sheet. Further, it was difficult to align the CNT films to a desired position in a desired direction in the density-increasing step described below.

In order to solve the problems, the CNT films produced by the method described above were set together with the substrate used for synthesis so as to be within a view field of a solid microscope, and the CNT films were detached from the substrate used for synthesis under observation by a microscope. Upon detachment of the CNT films from the substrate, they were directly detached by tweezers under observation by the microscope.

Then, in order to increase the density of the taken-out CNT films, it was necessary to arrange the taken out CNT films on the substrate while controlling the direction of alignment of the taken out CNT films and expose them to the liquid. For this purpose, a method of moving the CNT film taken out in the take-out step onto a substrate previously dropped with the liquid, releasing the same from the tweezers and, subsequently, aligning the CNT film to an optional position in the liquid by tweezers with attachment of a membrane was adopted. The amount of the liquid to be dripped is about 1 to 5 drops by a Pasteur pipette. Further, in the density-increasing step, in a case where foams were generated to the CNT film exposed in the solution, or the tweezers or the membrane exposed to the solution, the aligned carbon nanotube bulk structure was sometimes creased. Therefore, the solution was disposed on the substrate used for increasing the density, the CNT film, the tweezers for handling the CNT film, and the membrane for handling the CNT film were dipped sufficiently into the solution, and observed by a solid microscope, so that foams were not generated. Isopropyl alcohol was used as the liquid for exposing the CNT film. As described above, the CNT film was arranged on the substrate while controlling the position and the direction thereof.

The CNT film was increased in the density by exposure to the liquid and drying, to obtain an aligned carbon nanotube bulk structure. Arrangement and density increase of the CNT film may be effected simultaneously. In this case, if the solution was dried from the periphery of the CNT film, only a portion of the CNT film is sometimes increased in the density and adhered as the aligned carbon nanotube bulk structure to the substrate. In this case, it is difficult to arrange the CNT film at an optional position or obtain a desired direction of alignment. Therefore, arrangement of the CNT film was completed before drying of the solution and completion of the density-increasing step.

After the solution was evaporated spontaneously in air at a room temperature and the CNT film was fixed, the surface of the CNT film was observed, and the solution was dried spontaneously till the surface of the CNT film became visible to increase the density of the CNT film.

As the solution, isopropyl alcohol or methanol was used. Isopropyl alcohol and methanol easily impregnated between CNTs in the CNT film to increase the density of the entire CNT film.

Further, during the density increase of the CNT film, a portion of the CNT film sometimes warped on the surface of the substrate. In such a case, warping was suppressed by applying illumination during drying of the CNT film and controlling the evaporation of the solution by weakening the illumination when the surface of the CNT became visible during drying of the CNT film, thereby controlling the rate of the density-increasing treatment.

As another procedure for the arrangement and the density increase of the CNT film, a solution was dropped subsequently to the previously arranged CNT film to increase the density.

As described above a high density aligned carbon nanotube bulk structure disposed at a desired position and in a desired direction on the substrate, having a desired shape, and in which CNTs were aligned in the longitudinal direction was obtained. An aligned carbon nanotube bulk structure of a desired shape can be obtained by adjusting the size of the CNT film to be used.

The density of the thin-filmy aligned carbon nanotube bulk structure was about 0.6 g/cm$^3$, and the size of the thin film was 1 cm×1 cm×height 70 μm.

Example 6

Columnar Article

An aligned carbon nanotube aggregate was grown through CVD under the condition mentioned below.
Carbon compound: ethylene, feeding speed 100 sccm
Atmosphere (gas) (Pa): helium/hydrogen mixed gas, feeding speed 1000 sccm, one atmospheric pressure
Water vapor amount added (ppm): 150 ppm
Reaction temperature (° C.): 750° C.
Reaction time (min): 10 min
Metal catalyst (existing amount): thin iron film, thickness 1 nm
Substrate: silicon wafer A sputtering vapor deposition device was used for disposing the catalyst on the substrate; and an iron metal having a thickness of 1 nm was disposed through vapor deposition. The catalyst was patterned columnarly, in which the diameter of each column was 50 μm.

Next, using tweezers, the surface of the substrate was wetted with a liquid so that the aligned carbon nanotube bulk aggregate produced in the above could be dipped in and exposed to the liquid from the point at which it is contacted with the substrate, and then this was put on a hot plate kept at 70° C. and dried thereon, whereby a columnarly-patterned aligned carbon nanotube bulk structure of the present invention was thus produced.

The density of the columnar aligned carbon nanotube bulk structure was about 0.6 g/cm$^3$, and the size of each column was diameter 11 μm×height 1000 μm.

Evaluation for the purity, the alignment, and the specific surface area of the aligned carbon nanotube bulk structures obtained in Examples 1 to 6 are to be described below.
[Purity of Aligned CNT Structure]

The carbon purity of the aligned carbon nanotube bulk structure was determined based on the result of elemental analysis by using fluorescent X-rays. Upon elemental analysis by fluorescent X-rays, carbon was 99.9%, iron was 0.013%, and other elements were not measured. In view of the result, the carbon purity was computed as 99.9%.

Further, the absolute purity was 98% when estimated by the method described in the non-patent document; the Journal of Nano Letters, vol. 9, pp 769 to 773.
[Evaluation for Degree of Alignment According to θ-2θMethod]

The aligned property of the obtained aligned carbon nanotube bulk structure was evaluated by X-ray diffractiometry according to the θ-2θmethod.

The X-ray diffraction spectrum of the specimen is as shown in FIG. 2 to FIG. 3. The observed diffraction peaks reflect the periodicity for the constitution of the carbon six-membered ring constituting the single-walled CNT and the periodicity for the packing between the single-walled CNTs. The (CP) diffraction peak observed at a low angle (0 to 15° reflects the spacing between the single-walled CNTs to each other. A moderate diffraction peak observed near 25° reflects the spacing between the carbon six-membered ring sheets of different single-walled CNTs. The diffraction peak near 42° reflects the (100) face of the single-walled CNT carbon six-membered ring, and the diffraction peak near 77 to 78° reflects the (110) plane. In the carbon six-membered ring structure of the CNT, since the carbon six-membered ring structure of the CNT is rounded and curved, the peaks do not align closely with the diffraction peaks of graphite. Further, while the peak positions change somewhat depending on the size and the degree of alignment of the single-walled CNT, the diffraction peaks can be identified.

When the Herman's orientation factor F was calculated based on the result, it was 0.4 to 0.62 for the (CP) diffraction peak and 0.75 for the (002) diffraction peak.

[Evaluation for Degree of Alignment According to Laue Method]

The degree of alignment of the obtained aligned carbon nanotube bulk structure was evaluated by X-ray diffractiometry according to the Laue method.

As a result, observed diffraction peaks such as at (CP), (002), (100) of the alignment carbon nanotube bulk structure are each in an elliptic shape and exhibit anisotropy. The anisotropy exhibits that the single-walled CNT is aligned.

When the Herman's orientation factor F was calculated based on the result, it was 0.38 for the (CP) diffraction peak and 0.61 for the (002) diffraction peak.

The aligned carbon nanotube bulk structure was observed by a scanning type electron microscope (SEM), and FFT images were calculated based on the observed SEM images. While the FFT images were different depending on the magnification factor and the position of the SEM image, they exhibited anisotropy respectively. This exhibits that the CNTs in the structure were aligned.

A transformation intensity was determined from the reference direction ($\phi=0$) to $\phi=\pi/2$ in the radial direction while keeping an equal distance from the original point of the FFT image to obtain an intensity profile. When the Herman's orientation factor F was calculated by using the intensity profile, a value from 0-3 to 0.6 was obtained to reveal that the aligned carbon nanotube bulk aggregate is aligned.

For 50 mg of the aligned carbon nanotube bulk structure, adsorption/desorption isothermal curves of liquid nitrogen at 77K was computed by using Nippon Bel's BELSORP-MINI (adsorption equilibrium time: 600 sec). The entire adsorption amount showed an extremely large value (742 mL/g). When the specific surface area was computed based on the adsorption/desorption isothermal curves, it was 1100 $m^2/g$.

The adsorption/desorption isothermal curves of an unopened aligned carbon nanotube bulk structure showed a high linearity in a region of a relative pressure at 0.5 or less, $\alpha_s$ plot also showed a linearity in a region at 1.5 or less. The results of the computation exhibit that the CNTs constituting the aligned carbon nanotube bulk structure are unopened.

For the specific surface area conducted by the method described in the Journal of Nano Letters, vol. 2 (2002), pp 385 to 388 for the identical aligned carbon nanotube bulk structure, the outer surface area was 1090 $m^2/g$, the inner surface area was 59 $m^2/g$, and the entire specific surface area was 1149 $m^2/g$.

The distribution for the pore diameter was determined according to the BJH method based on the adsorption/desorption isothermal curves of liquid nitrogen at 77K. As shown in FIG. 18, the distribution maximum for the pore diameter is present at 5 nm or less and it can be seen that the pore diameter distributes mainly at 10 nm or less. The spacing (pore) between each of neighboring single-walled CNTs of the aligned carbon nanotube bulk structure having the distribution for the pore diameter as described above is 10 nm or less, CNTs in the aligned carbon nanotube bulk structure are filled at a high density, and pores and voids at the micro scale are scarcely present.

Further, a 50 mg portion was torn from the identical alignment carbon nanotube bulk structure by tweezers, arranged evenly on a tray made of alumina, and placed in a muffle furnace. Then, temperature was elevated to 500° C. at 1° C./min and a heat treatment was conducted at 500° C./1 min under oxygen (about 20% concentration). The weight of the specimen after the heat treatment was 50 mg and a substantially identical weight as in the initial state remained after the heat treatment. In the same manner as described above, adsorption/desorption isothermal curves of liquid nitrogen (FIG. 4) were computed in the same manner as described above for the specimen after the heat treatment. As a result, when the specific surface area was estimated, it was about 1900 $m^2/g$. The specimen after the heat treatment had a larger specific surface area compared with the specimen before the heat treatment to suggest that top end of the carbon nanotube was opened by the heat treatment. In the drawing P represents an adsorption equilibrium pressure and $P_0$ represents a saturated vapor pressure.

Example 7

Supercapacitor

The aligned carbon nanotube bulk aggregate obtained in Example 4 was demonstrated for evaluation of its properties as a capacitor electrode. A test cell was constructed, n which an electrode material comprising 2 mg of the aligned carbon nanotube bulk aggregate was used as the working electrode, and Ag/Ag+ was as the reference electrode. As the electrolytic solution, used as a propylene carbonate PC-type electrolytic solution. Thus constructed, the constant current charge/discharge characteristic of the test cell was determined. The cyclic voltamography data are shown in FIG. 19. This graph confirms that the aligned carbon nanotube bulk aggregate of Example 4 serves as a capacitor material.

Example 8

Gas Storing Material

Measurement for hydrogen storage was effected for 100 mg of the aligned carbon nanotube bulk structure obtained in Example 1 by using a high pressure mono-ingredient adsorption amount measuring apparatus (FMS-AD-H) manufactured by Nippon Bel. As a result, the storage amount of hydrogen was 0.4% by weight at 10 MPa and 25° C. Further, it was demonstrated that reversible desorption was conducted depending only on the pressure also in the desorption process.

Example 8

Gas Storage 100 mg of the aligned carbon nanotube bulk aggregate obtained in Example 1 was analyzed for hydrogen absorption, using Nippon Bell's high-pressure single component adsorption meter (FMS-AD-H). As a result, the hydrogen absorption was 0.4% by weight at 10 MPa and 25° C. Regarding the releasing process, the sample underwent reversible gas release depending only on pressure.

Example 9

Heat Conductor, Heat Dissipation Material

The aligned carbon nanotube bulk aggregate obtained in Example 1 was analyzed for the heat diffusion ratio to thereby determine the heat conductivity thereof. The test temperature was room temperature, and the size of the sample was 1 cm×1 cm. The sample was analyzed as three forms, the sample alone, and two others each with a glass plate disposed above and below the sample. The heat diffusion ratio was determined by a CF method and zero extrapolation for the pulse heating energy dependency.

In vacuum, the sample temperature was nearly constant and the thermal loss effect was small; and in air, the sample temperature lowered and the heat loss effect was large. These confirm the heat dissipation effect of the aligned carbon nanotube bulk aggregate. Accordingly, the aligned carbon nanotube bulk aggregate is expected to be useful as a heat conductor and a heat dissipation material.

Example 10

Electric Conductor

The aligned carbon nanotube bulk aggregate obtained in Example 4 was cut into a piece having a size of 2 cm×2 cm×height 70 μm; and copper plates were kept in contact with both sides thereof, the sample was analyzed for the electric transporting characteristic according to a two-terminal method using a prober, Cascade Microtech's Sumit-12101B-6 and a semiconductor analyzer, Agilent's 4155C. The results are shown in FIGS. 14 and 15. From these drawings, the aligned carbon nanotube bulk aggregate of the above Example is expected to be useful as an electric conductor.

Example 11

Flexible Electrically Conductive Heater

The aligned carbon nanotube bulk aggregate obtained in Example 4 was shaped into a structure as in FIG. 18, fitted around a glass bottle filled with water, and a power of 15 W (0.1 A×150 V) was applied thereto. As a result, it was confirmed that the structure could be usable as a heater.

The invention claimed is:

1. An aligned carbon nanotube bulk structure comprising a plurality of carbon nanotubes (CNTs) having an alignment property, wherein a weight density of the plurality of carbon nanotubes is 0.2 to 1.5 g/cm$^3$, a purity of the plurality of carbon nanotubes measured by fluorescent X-rays is 98% or more and a specific surface area of the plurality of carbon nanotubes is 800 m$^2$/g or more and 2600 m$^2$/g or less, and the plurality of carbon nanotubes has an alignment defined by at least one of the following conditions:

1) in a case of measuring an X-diffraction intensity by irradiating X-rays from a first direction and a second direction perpendicular to the first direction (θ-2θ method), an angle θ and a reflection azimuth at which the reflection intensity from the second direction is higher than the reflection intensity from the first direction are present, and an angle θ and a reflection azimuth at which the reflection intensity from the first direction is higher than the reflection intensity from the second direction is present, in which the first direction is an alignment direction of the CNT or direction perpendicular to the alignment direction of the CNT, and the second direction is a direction perpendicular to the alignment direction of the CNT or the alignment direction of the CNT, 2) a diffraction peak pattern exhibiting the presence of anisotropy appears in a case of measuring an X-ray diffraction intensity by a 2-dimensional diffraction pattern image obtained by irradiating X-rays from a direction perpendicular to the longitudinal direction of CNT (Laue method), and 3) a Herman's orientation factor is larger than 0 and smaller than 1 when using the X-ray diffraction intensity obtained according to the θ-2θ method or the Laue method.

2. The aligned carbon nanotube bulk structure according to claim 1, wherein the spacing between neighboring CNTs adjacent to each other is 10 nm or less.

* * * * *